(12) United States Patent
Zhovnirnovsky et al.

(10) Patent No.: US 9,537,611 B2
(45) Date of Patent: Jan. 3, 2017

(54) METHOD AND APPARATUS FOR IMPROVING THE PERFORMANCE OF TCP AND OTHER NETWORK PROTOCOLS IN A COMMUNICATIONS NETWORK USING PROXY SERVERS

(71) Applicant: Instart Logic, Inc., Palo Alto, CA (US)

(72) Inventors: Igor Zhovnirnovsky, Newton, MA (US); Subhash Roy, Lexington, MA (US)

(73) Assignee: Instart Logic, Inc., Palo Alto, CA (US)

( * ) Notice: Subject to any disclaimer, the term of this patent is extended or adjusted under 35 U.S.C. 154(b) by 0 days.

(21) Appl. No.: 14/400,325

(22) PCT Filed: Nov. 6, 2013

(86) PCT No.: PCT/US2013/068820
§ 371 (c)(1),
(2) Date: Nov. 10, 2014

(87) PCT Pub. No.: WO2014/074650
PCT Pub. Date: May 15, 2014

(65) Prior Publication Data
US 2015/0236819 A1    Aug. 20, 2015

Related U.S. Application Data

(60) Provisional application No. 61/724,275, filed on Nov. 8, 2012, provisional application No. 61/867,583, filed on Aug. 19, 2013.

(51) Int. Cl.
*H04L 1/00*    (2006.01)
*H04L 1/08*    (2006.01)
(52) U.S. Cl.
CPC .............. *H04L 1/08* (2013.01); *H04L 1/0041* (2013.01); *H04L 1/0057* (2013.01)

(58) Field of Classification Search
CPC ...... H04W 72/04; H04W 72/05; H04W 72/06; H04W 84/12; H04W 84/13; H04W 84/14; H04W 84/15
(Continued)

(56) References Cited

U.S. PATENT DOCUMENTS

| 5,530,693 A | * | 6/1996 | Averbuch | ............. H04W 36/02 370/331 |
| 6,931,211 B2 | * | 8/2005 | English | ............. H04B 10/801 385/14 |

(Continued)

FOREIGN PATENT DOCUMENTS

EP    2037615    3/2009

OTHER PUBLICATIONS

McKinley et al., An Experimental Study of Adaptive Forward Error Correction for Wireless Collaborative Computing, Proceedings of Saint 2001 Symposium on Applications and the Internet, San Diego, CA, USA, IEEE Computer Society, Los Alamitos, CA, USA, Jan. 8, 2011.

(Continued)

*Primary Examiner* — Dady Chery
(74) *Attorney, Agent, or Firm* — Van Pelt, Yi & James LLP

(57) ABSTRACT

A method and apparatus that improves the performance of a data network by segmenting the TCP path and implementing a proprietary protocol (DPR™) over a network. Bandwidth is reduced and reliability improved by using an erasure coded algorithm to generate a predicted number of redundant coded packets used to reconstruct lost data packets. Coded packets are generated at the transmission side and the coded packets together with the raw data packets successfully sent over the channel are used to reconstruct lost raw data packets. The DPR™ erasure coding to adjust for packet (Continued)

loss in real time protocol provides a multiplexed tunnel for a multiplicity of TCP sessions from a client to a cloud proxy. DPR™ implements congestion management, flow control, reliability, and link monitoring. Other network protocols (such as UDP) are supported with a reliability protocol based upon network coding that improves the transmission reliability.

20 Claims, 13 Drawing Sheets

(58) Field of Classification Search
USPC .................. 370/329, 216, 341, 346, 348
See application file for complete search history.

(56) References Cited

U.S. PATENT DOCUMENTS

| | | | | |
|---|---|---|---|---|
| 7,376,435 | B2* | 5/2008 | McGowan | H04M 15/00 |
| | | | | 455/509 |
| 7,751,430 | B2* | 7/2010 | Strong | H04B 7/2656 |
| | | | | 370/465 |
| 7,958,435 | B2 | 6/2011 | Kure et al. | |
| 7,986,676 | B2* | 7/2011 | Waxman | H04W 28/22 |
| | | | | 370/231 |
| 8,577,673 | B2 | 11/2013 | Gao | |
| 8,621,320 | B2 | 12/2013 | Yang et al. | |
| 8,856,624 | B1 | 10/2014 | Paniconi | |
| 8,959,405 | B2 | 2/2015 | Ikawa et al. | |
| 2001/0017850 | A1 | 8/2001 | Kalliokulju et al. | |
| 2004/0034708 | A1 | 2/2004 | Pelletier et al. | |
| 2005/0063302 | A1 | 3/2005 | Samuels et al. | |
| 2005/0281232 | A1 | 12/2005 | Kim et al. | |
| 2006/0251010 | A1 | 11/2006 | Ramakrishnan et al. | |
| 2007/0133515 | A1 | 6/2007 | Kumar et al. | |
| 2008/0063110 | A1 | 3/2008 | Averbuch et al. | |
| 2009/0141824 | A1 | 6/2009 | Xia et al. | |
| 2009/0161606 | A1* | 6/2009 | Akkarakaran | H04L 9/3247 |
| | | | | 370/329 |
| 2010/0014520 | A1 | 1/2010 | Matsumoto et al. | |
| 2010/0218037 | A1 | 8/2010 | Swartz et al. | |
| 2011/0064036 | A1 | 3/2011 | Tsai et al. | |
| 2011/0093758 | A1* | 4/2011 | Etkin | H03M 13/373 |
| | | | | 714/751 |
| 2011/0197106 | A1 | 8/2011 | Kishigami et al. | |
| 2012/0044943 | A1 | 2/2012 | Hinz et al. | |
| 2012/0257527 | A1 | 10/2012 | Jorgensen | |
| 2012/0278677 | A1 | 11/2012 | Kure et al. | |
| 2014/0016469 | A1 | 1/2014 | Ho et al. | |
| 2014/0064296 | A1 | 3/2014 | Haeupler et al. | |

OTHER PUBLICATIONS

Koetter et al. "An algebraic approach to network coding." IEEE/ACM Transactions on Networking (TON) 11.5 (2003): 782-795.

* cited by examiner

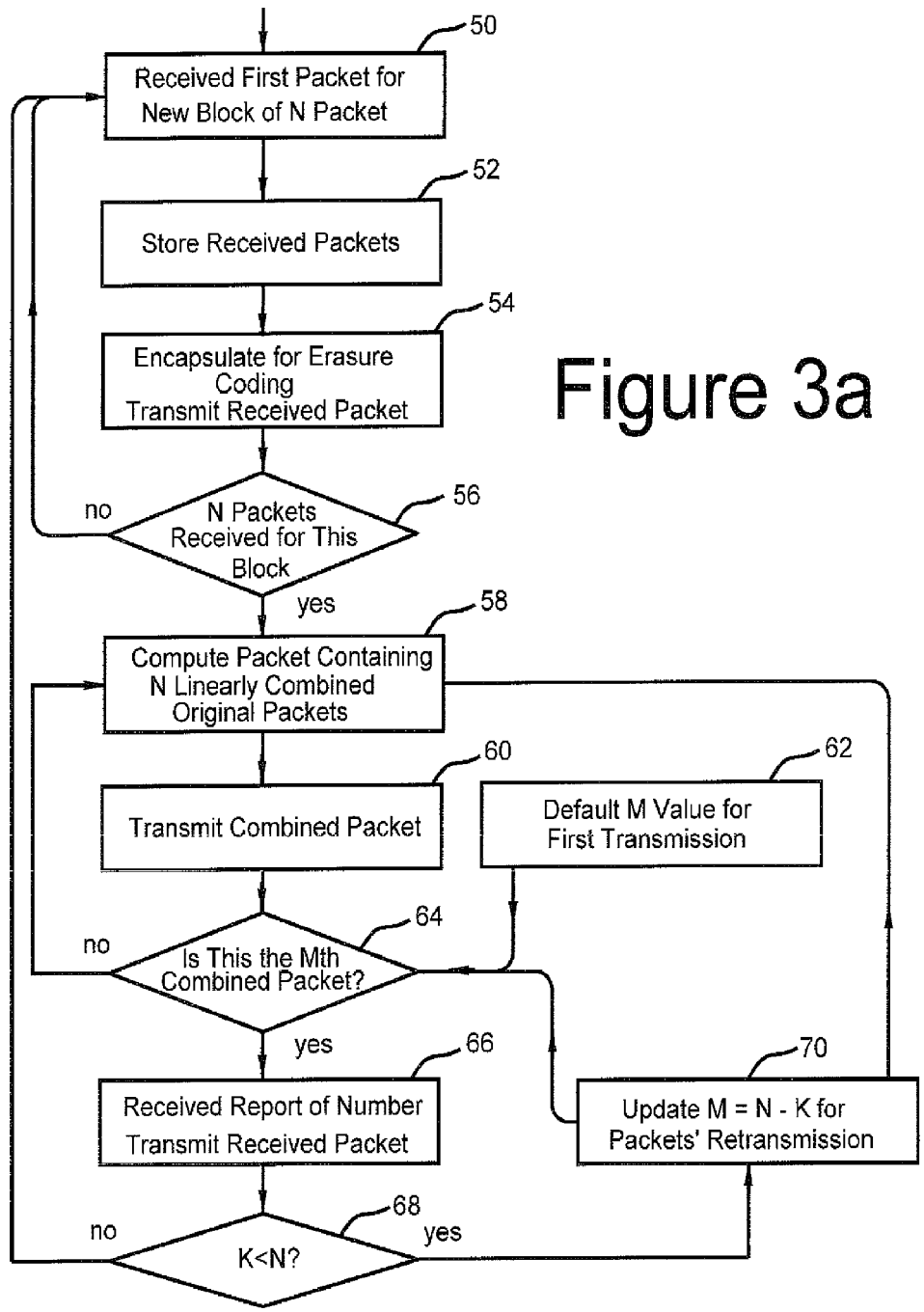

METHOD AND APPARATUS FOR IMPROVING THE PERFORMANCE OF TCP AND OTHER NETWORK PROTOCOLS IN A COMMUNICATIONS NETWORK USING PROXY SERVERS

CROSS-REFERENCE TO RELATED APPLICATIONS/INCORPORATION BY REFERENCE

This patent application makes reference to, claims priority to and claims benefit from: U.S. Provisional Patent Application Ser. No. 61/724,275 entitled METHOD AND APPARATUS FOR IMPROVING THE PERFORMANCE OF TCP AND OTHER NETWORK PROTOCOLS IN A COMMUNICATIONS NETWORK filed on Nov. 8, 2012 and U.S. Provisional Patent Application Ser. No. 61/867,583 entitled METHOD & APPARATUS FOR IMPROVING THE PERFORMANCE OF TCP AND OTHER NETWORK PROTOCOLS IN A COMMUNICATIONS NETWORK USING PROXY SERVERS, filed on Aug. 19, 2013. Each of the applications is hereby incorporated herein by reference in its entirety.

FIELD OF THE INVENTION

The invention relates generally to communication networks. More specifically, the invention provides for improved communication performance over lossy links.

INTRODUCTION

The present invention includes aspects of a packet transmission apparatus, a communication system and a program.

Data communication over wireless channels has become increasingly common. For example, WiFi is used for wireless communication for connections based on the IEEE 802.11 standard. Many other wireless channels may be used such as WiMAX, 3G, mesh networks, or community networks, to name a few. Wireless channels may be lossy such that data may often be lost during transmission due to any one of a variety of conditions. For example, weather conditions may be such that the transmission of communication data may be impaired. Likewise, there may be interference to data transmission from a variety of causes such as interference from other devices transmitting on the same channel. Any of these factors may contribute to additional loss in data packet transmission or increased data packet erasure rates. In end-to-end transport protocols (e.g., Transmission Control Protocol (TCP)) data communication is provided across interconnected networks or devices. Transmission Control Protocol (TCP) is utilized in communications networks in order to provide a mechanism for reliability, flow control and congestion control.

In such transport protocols, of which TCP is one example, data to be transmitted is broken into packets. The data packets are transmitted to a receiver where the packets are verified and reassembled into the original message. An acknowledgement (ACK) is returned from the receiver to indicate that the data packets were received. If an ACK is not returned, the data packet may have to be re-transmitted. In addition, when the sender does not receive the ACK within a specified period of time, the transport protocol at the sender may timeout. This results in a reduced rate of transmission of packets. Communications networks are by definition statistical in nature and packets are commonly lost creating "erasure losses" and "out of order delivery." TCP will retransmit any lost packets, rearrange out of order packet delivery sequences and modulate transmission rates to minimize perceived congestion losses.

TCP is optimized for reliable transmission rather than minimizing transmission latency or maximizing network "good-put". TCP incorporates algorithms to minimize congestive losses (such as TCP Tahoe, Vegas and Reno) and relies upon end-to-end acknowledgements, which limits the maximum transmission rates based upon the round trip time of the communications link. Since the round trip time of a communications link has no direct correlation with the available bandwidth, the maximum TCP transmission rate for a session is not tied to the available communications bandwidth.

A single lost packet in an underlying TCP connection stalls all of the multiplexed HTTP streams over that connection. Questions of congestion control are typically the province of TCP. However, TCP itself is not good enough. First, the consensus around what TCP should assume and should aim for has frayed. Datacenters turn off slow start or run datacenter TCP or more exotic schemes. Satellite operators split the TCP connection and run their own protocol on the satellite link. Movie studios avoid TCP when sending large files of movie footage from Europe back to Hollywood, because TCP underutilizes high-delay links.

Second, TCP's fragility is constraining the lower layers. Networks mask stochastic losses, and avoid out-of-order delivery or multipath routing, because TCP reacts poorly to packet loss and out-of-order delivery. It would be preferable to make TCP's assumptions explicit and allow lower layers to innovate as they see fit, with the confidence that the transport layer can evolve as necessary.

Finally, even applications that do use TCP often don't really use TCP in the traditional sense. A Web browser may open over a hundred TCP connections just to load one Web page! Applications like Netflix build their own rate control on top of TCP, based on TCP's performance in downloading four-second chunks of coded video. This leads to well-documented perverse results.

Loss and latency associated issues can affect other protocols in the communications stack (e.g., UDP, integrated with media streaming or VoIP, or any wireless link-layer design). Congestion may occur in a network when the amount of traffic on a communication link or path exceeds the capacity of the link or path. In such cases, excess data may be discarded or excess data may be buffered until congestion eases. If congestion persists, however, congestion is controlled by discarding data packets in the buffer to clear the buffer in a packet-switched network. Moreover, channel impairments or interference may also result in signal to noise ratio (SNR) degradation and bit errors which may in turn result in packet errors or erasures.

User Datagram Protocol (UDP) is utilized in communications networks primarily for real time applications that suffer from delay based reliability mechanisms (retransmissions). UDP is typically a fixed rate transmission without loss recovery mechanisms. Accordingly, in lossy environments, UDP based communication such as VoIP and video can appreciably degrade creating perceptible loss of fidelity.

In an FEC (forward error correction) system, since decoding cannot be performed when even one packet is missing in an FEC block, in order to realize the packet recovery rate equal to that of reliable transport protocol systems, it is necessary to transmit more redundant packets than required by the reliable transport protocol retransmission. Accordingly, if a block of data packets is not received with a sufficient number of redundant packets generated by the forward error correction algorithm, it is necessary to retransmit the block together with the redundant packets. This results in increased network congestion. In addition, there is a problem that the transmission rate of original data is unnecessarily reduced.

In recent years, multimedia data is often conveyed through a best-effort communication network such as the Internet. In this type of data transfer, a download transmission system or a stream transmission system is used. The multimedia data can include, for example, video files, audio files, combinations of these, and data including these as part. In the inventive system, the term multimedia data is used in the sense of data including time information or information relating to a play-out order.

In the case of download based play-out systems, a data file is downloaded from a delivery server to a recording area at a receiver, and at the point in time when the transfer has completely ended, the play-out thereof is started. Accordingly, the download based play-out system is unsuitable for the play-out of multimedia data in which the play-out takes a long time, or for the play-out of multimedia data in which a real time play-out is required. On the other hand, in the case of a streaming based play-out system, the play-out of a data file is started at a time when only partial data has been transferred from a sender to a receiver. Thus, this is used for Internet telephony, remote video conferencing, video on demand, network camera monitoring, Internet television and other services.

These applications have all defected from the idea of a one-size-fits-all TCP to enforce fairness on the Internet. There exists a need for these disparate schemes to all be united under a common framework, where packet loss is minimized and transmission is enhanced.

The development of the Internet has created several distinct infrastructure elements allowing its seamless, secure and efficient functioning. One such element is a proxy that separates the information sinks from information sources and services (depending on a proxy type) as either request aggregator and load balancer, firewall, encryption/description point as a security gateway or performance enhancing entity providing more efficient Internet traffic service than globally used protocols. Performance Enhancing Proxies (PEP) are network agents designed to improve the end-to-end performance of some communications protocols. Performance Enhancing Proxies standards are defined in RFC 3135 (Performance Enhancing Proxies Intended to Mitigate Link-Related Degradations) and RFC 3449 (TCP Performance Implications of Network Path Asymmetry).

The standard proxy is usually deployed in a situation calling for more control over traffic or for aggregation of a specific traffic type for centralized processing. On a client side, all (or specific) traffic from the client's machine is re-directed to a proxy server by configuring the client machine's routing tables. This traffic is propagated over the Internet with no special consideration for loss protection, speed improvement or any other enhancements of the existing data delivery mechanisms. Once received by a proxy server, data is processed and either blocked or sent to the destination in original or modified form on behalf of the sender. In the reverse direction, the proxy server is receiving data from an Internet and delivering it to the specific client after preprocessing, if necessary.

There exists a need for a method and system for reducing performance loss in a wireless communication network and enhancing transport layer protocol performance in lossy communication channels due to misinterpretation of the loss as being related to congestion. There is also a need for a method and system to increase network resiliency to bit or packet erasures.

SUMMARY OF INVENTION

We have developed a system and method to address the aforementioned packet loss problems that utilizes a novel Performance Enhancing Proxy Server using erasure coding techniques and our proprietary packet recovery methods. In preferred embodiments, Network Coding (NC) such as that disclosed in U.S. Pat. Nos. 7,706,315 and 8,068,426 is a preferred erasure coding method. In accordance with a preferred embodiment of the invention, as set forth below, this type of erasure coding is used.

A system utilizing our novel Erasure Coding Performance Enhancing Proxy (ECPEP) decreases transmission losses as seen by the legacy protocols; thus allowing more efficient data transfer and significantly better link capacity utilization.

Preferred embodiments of the invention use a constructor such as a Layer 5 (session layer), Layer 6 (presentation layer), or Layer 7 (application layer) local Proxy which connects information data flow from the kernel space of the operating systems network stack in the kernel space to the user space. In computer networks, a proxy server is a server (a computer system or an application) that acts as an intermediary for requests from clients seeking resources from other servers. A client connects to the proxy server, requesting some service, such as a file, connection, web page, or other resource available from a different server and the proxy server evaluates the request as a way to simplify and control their complexity.

The preferred embodiment comprises a transparent proxy SW (software) module on the client device that communicates with corresponding proxy server SW components. Also known as an intercepting proxy or forced proxy, a transparent proxy intercepts normal communication at the network layer without requiring any special client device configuration. Client device resident applications need not be aware of the existence of the proxy. A transparent proxy module is typically located between the client device's application space and the Internet interface, with the proxy server performing some of the functions of a gateway or a router. A transparent proxy is a proxy that does not modify the data traffic beyond what is required for proxy authentication and authorization.

With regard to current industry standards proxies, the current invention adds extra functionality that allows loss recovery between a proxy client and the proxy server. The inventive proxy therefore enhances the quality of data transmission resulting in reduced transfer time, reduced latency and significantly improved quality of experience for an end user without any changes to hardware or an operating system.

The present invention provides:
1) connection between the application and the erasure coding module in the user programming space,
2) a selector for separating traffic based on source and destination address,
3) erasure coding methods to correct network losses for both reliable data transmission protocols (TCP) and unreliable data transmission protocols (UDP), and
4) a method to transmit/receive the information using standard system communication means.

The packet transmission system transmits a packet that may or may not have a specific arrival deadline through a best-effort network. The packet transmission system of a preferred embodiment includes an automatic packet retransmission function to control required retransmissions, an erasure coding function to optionally or mandatorily add a redundant data packet(s) to a block of data packets, and a redundancy determining function to dynamically determine the required amount of redundant information (coded packets) based on observed network state change, so that a loss compensation at a receiver is achieved by recovery of the undelivered packet(s) (lost packets) using only additional redundant information (coded packets), as more fully detailed below. This eliminates the need for data packet retransmission. The system includes preferred methods and apparatuses.

A method is provided for transmitting a data block having a specific arrival deadline. The data block contains a set number of packets, N. The method comprises setting a loss estimate value M; setting the number of packets to a first number of packets N; erasure coding the N packets to create a set of M linear combinations (coded packets) which are a linear combination of the original N packets; adding the M linear combinations of the original N packets, transmitting the data block and the M linear combinations, so that the transmitted packets consist of the N original packets and the M linear combination packets. Finally, any additional coded packet(s) for this block is/are generated and sent in subsequent packet transmission(s). In a preferred embodiment, M is not set until there is packet loss.

The aforementioned inventive method if compared to a traditional system transferring data with a specific arrival deadline (of the type that will discard lost packets resulting in incomplete reception) allows for lost packet recovery from the redundant information that may be accomplished by the specific deadline, therefore resulting in data reception with substantially improved performance.

A method of transmitting a packetized data stream having a guaranteed delivery without a fixed deadline is provided. The data block contains a number of packets N, typically in the range of 5-30 packets, though there is no upper or lower limit on block size. The method comprises:
  a) setting a value of M erasure recovery packets to an initial loss estimate, M being an arbitrary number or one based on expected channel characteristics;
  b) selecting the number of packets n to be a first number of packets N corresponding to a selected block size of N;
  c) transmitting originally received packets leaving a copy for further processing;
  d) upon transmitting the N current original raw data packets, erasure coding across the packets accumulated up to this point in time to create a set of M linear combinations which are linear combinations of the accumulated original packets;
  e) upon transmitting the N original packets transmitting the M new linear combinations of the original N packets, wherein the totality of the transmitted packets comprises the M linear combination packets and N original packets (M+N);
  f) transmitting additional coded packets, if required at the receiver side to recover lost data packets;
  g) dynamically determining the amount of redundancy based on the network state change observed after the initial transmission of the current data block and a packet transmission rate to alter the initial loss estimate value from M to M', to recalculate the number of erasure recovery packets based on the updated loss estimate value M';
  h) and transmitting a following data block comprising N original raw data packets and the updated number of erasure recovery packets M', wherein the number M' of erasure recovery packets is based on the estimated updated packet loss estimate. The initial estimate of the loss value may be expressed as a number or a percentage of the block size; and
  i) repeating the transmission cycle for subsequent blocks of new raw data packets until the data is delivered.

In a preferred embodiment, M is not set until there is packet loss. There are many other examples of alternative methods of generating coded packets including Reed-Solomon (RS) coding, LDPC (Low Density Parity Check) coding, Luby transform (LT) coding, Raptor coding, Network coding, Online codes or other types of erasure codes to which the present invention may be applied.

The inventive system provides a method for the transmission of a plurality of blocks of data packets in a digital data sequence. The inventive system has a first transceiver that receives a first block of N data packets for transmission through a data communications channel to a second transceiver at the other end of the data communications channel. The system then duplicates the first block of packets and stores the packets to make a stored copy of the first block of packets. The first block of data packets is transmitted $N_T$ from the first transceiver through the data communications channel to the second transceiver at the other end of the full duplex data communications channel. The transmitting transceiver receives information indicating the number, $N_R$, of data packets received by the second transceiver, and defines the number, $M_T$, of erasure coded packets needed at the second transceiver to reconstruct the lost packets as $M_T = N_T - N_R$. If $M_T$ is greater than zero, the system generates at least $M_T$ erasure coded packets from the stored copy of the first block of packets. The system transmits at least $M_T$ erasure coded packets from the first transceiver through the data communications channel to the second transceiver at the other end of the data communications channel. The system receives an indication whether the erasure coded packets received by the second transceiver are sufficient together with the $N_R$ received data packets to reconstruct lost data packets. If the erasure coded packets received by the second transceiver are sufficient together with said $N_R$ received data packets to reconstruct lost data packets then the second transceiver reconstructs the lost data packets. If the erasure coded packets received by the second transceiver are not sufficient together with said $N_R$ received data packets to reconstruct lost data packets, the system repeats the above steps, until the erasure coded packets received by the second transceiver are sufficient together with said $N_R$ received data packets to reconstruct lost data packets enabling the second transceiver to reconstruct the lost data packets.

In another embodiment of the inventive system a second method for the transmission of a plurality of blocks of data packets in a digital data sequence is described. A first transceiver receives a first block of N data packets for transmission through a full duplex data communications channel to a second transceiver at the other end of the full duplex data communications channel. The system sets an initial value, V, for the expected number of data packets in the block of N data packets that will be successfully received by the second transceiver. The first block of data packets is processed to generate the number of coded packets, M, required to replace the N−V expected lost packets. The first block of N data packets and the M coded packets are transmitted from the first transceiver through the full duplex data communications channel to the second transceiver at the other end of the full duplex data communications channel. Packet loss information is generated by the second transceiver. If packet loss is greater than expected, the system generates a predicted value for M by increasing M to $M_i$ if the number of packets lost is greater than N–V and transmits additional coded packets. If packet loss is greater than expected, the system repeats the steps above until the second transceiver indicates that sufficient packets have been received by the second transceiver to regenerate any and all lost data packets in the block. After sufficient packets have been received by the second transceiver to regenerate any and all lost data packets in the first block of data packets, the first transceiver receives a second block of N data packets for transmission through the full duplex data communications channel to the second transceiver at the other end of the full duplex data communications channel. The system calculates, on the basis of the packet loss information, an amended value, $V_a$, for the expected number of data packets in the block of N data packets that will be successfully received by the second transceiver and repeats the steps above substituting $V_a$ for V.

The coded packets, M, may be equal to the initial set value of expected data packets in the block of N data packets that will be received successfully by the second transceiver, V.

The processing of the first block of data packets may be performed using erasure coding. The processing of the first block of data packets may be performed using forward error correction.

If packet loss is greater than expected, $M_i$–M additional coded packets may be transmitted.

If packet loss is equal to that expected, a predicted value for M may be generated by using the previous value of M, and if the number of packets lost is smaller than N–V a predicted value for M may be generated by decreasing M to $M_d$.

The second transceiver may receive all or some of the first block of N data packets and the M coded packets from the first transceiver. The received packets in the first block of N data packets and the M coded packets may be counted to generate the packet loss information. The packet loss information may be transmitted from the second transceiver through the duplex data communications channel to the first transceiver at the other end of the duplex data communications channel.

Another embodiment of the inventive system comprises a method of communicating data in the form of an ordered series of data packets. The system transmits a first block of data packets comprising a series of N data packets and based upon a quality factor having a value functioning to represent the quality of a telecommunications channel, generates M coded packets, wherein the number M of coded packets is inversely proportional to the quality of the telecommunications channel, and wherein the coded packets are generated using an erasure coding scheme having an encoding algorithm and a decoding algorithm. The coded packets are generated by inputting the data packets into the encoding algorithm of the erasure coding scheme. The M coded packets are transmitted from an originating transceiver. A receiving transceiver receives the data packets and coded packets over the telecommunications channel. The system determines the number of N data packets and M coded packets, which were lost during transmission over the telecommunications channel from the originating transceiver to the receiving transceiver. A request is transmitted from the receiving transceiver for a number of additional coded packets based upon the number of lost packets. The transmitting transceiver receives the request for a number of additional coded packets and updates the value of the quality factor in response to the number of lost packets. Additional coded packets are transmitted over the telecommunications channel, from the transmitting transceiver, to the receiving transceiver. The receiving transceiver receives the additional coded packets and reconstructs lost data packets by executing the decoding algorithm associated with the erasure coding scheme. The system then transmits a subsequent block of data packets; and repeats the steps above for the subsequent block of data packets, using the updated value of the quality factor for the subsequent block of data packets.

The request for a number of additional coded packets may be for a number of coded packets equal to the number of lost packets. The value of the quality factor may be updated further by intermittently reducing the number of coded packets sent by the transmitting transceiver to determine whether fewer coded packets are needed for successful transmission of a block of data packets whereby improved telecommunications channel performance may be utilized.

In any case, the "sequence-agnostic" property of forward error correction may be used to reconstruct the packet flow because the order does not matter. Additionally, the transport layer can deliver in-order data segments to the application even as it waits for more coded packets to reconstruct the block.

According to a preferred embodiment of the invention, the amount of redundancy added to the original data stream can be optimized according to the state of the network independently of the adjustment of the transmission rate done in a manner that is known in the prior art that in turn is optimized to eliminate network congestion. Thus, the loss rate after error correction at the receiver can be kept within a desired range.

In accordance with the invention, a first packet transmission apparatus is provided. The first transmission apparatus transmits a packet having a guaranteed delivery without a fixed deadline delivery constraint through a best-effort network. The packet transmission apparatus includes an automatic packet retransmission section to control retransmission of an undelivered packet, an erasure coding section to control transmission of redundant information, and a loss estimation section to dynamically determine the level of redundancy necessary to maintain a lossless connection based on observed network state. The network state is calculated based on collected information comprising the packet loss rate, inter-packet arrival times (the delta between the timestamps of two packets which indicate the delta between their arrival times) and connection round trip time. Longer packet inter-arrival times and connection round trip time suggest a slower network.

Thus, the loss estimation section is configured to dynamically determine the level of redundancy necessary to maintain a lossless connection based on the received network state. In preferred embodiments, the network state information comprises round trip time information, but the same is not required.

In accordance with the invention, a second packet transmission apparatus is provided. The second packet transmission apparatus transmits a packet having a guaranteed delivery with a fixed deadline through a best-effort network. The packet transmission apparatus in preferred embodiments includes an automatic packet retransmission section to control retransmission of an undelivered packet, an erasure coding section to control transmission of redundant information, and a loss estimation section to dynamically determine the level of redundancy necessary to maintain a lossless connection based on observed network state information. The network state information would comprise the packet loss rate. The loss estimation section is configured to dynamically determine the level of redundancy necessary to maintain a lossless connection based on the received network state. In preferred embodiments, the network state information comprises round trip time information.

In preferred embodiments, based on the 1) received network state information, 2) an upper limit value of a transmission rate assigned for a transmission of the data packet block, and 3) the redundant packet to cause a designated loss rate for the retransmission after error correction at a receiver; the source transceiver dynamically determines the number of redundant packets to cause the designated loss rate for the retransmission at the receiver.

In preferred embodiments, the apparatus would combine the first and second packet transmission apparatus into a single apparatus to handle data traffic with or without fixed deadlines.

The inventive method provides the following processing functions in a packet transmission apparatus, which transmits a packet limited in arrival deadline through a best-effort network:
(a) deployed in a user program space control mechanism for packet automatic retransmission function to control retransmission of an undelivered packet;
(b) deployed in a user program space erasure coding function to add a redundant packet to a data packet block; and
(c) deployed in a user program space redundancy determination function to dynamically determine the necessary number of the redundant data packets based on observed network state information so that a loss rate after error correction at a receiver achieved via recovering the undelivered packets with nearly no retransmission satisfies an allowable loss rate after error correction.

According to a preferred embodiment, the amount of redundancy being added to each block can be modulated according to the state of the network. Thus, the loss rate after error correction at the receiver can be kept within an allowable range without unnecessarily increasing the congestion of the network or unnecessarily reducing the transmission amount of the data packet block.

Additional features and advantages are described herein, and will be apparent from, the following detailed description and the figures.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 3a shows an alternative transmission scheme of the inventive method;

DETAILED DESCRIPTION

Figure 1:
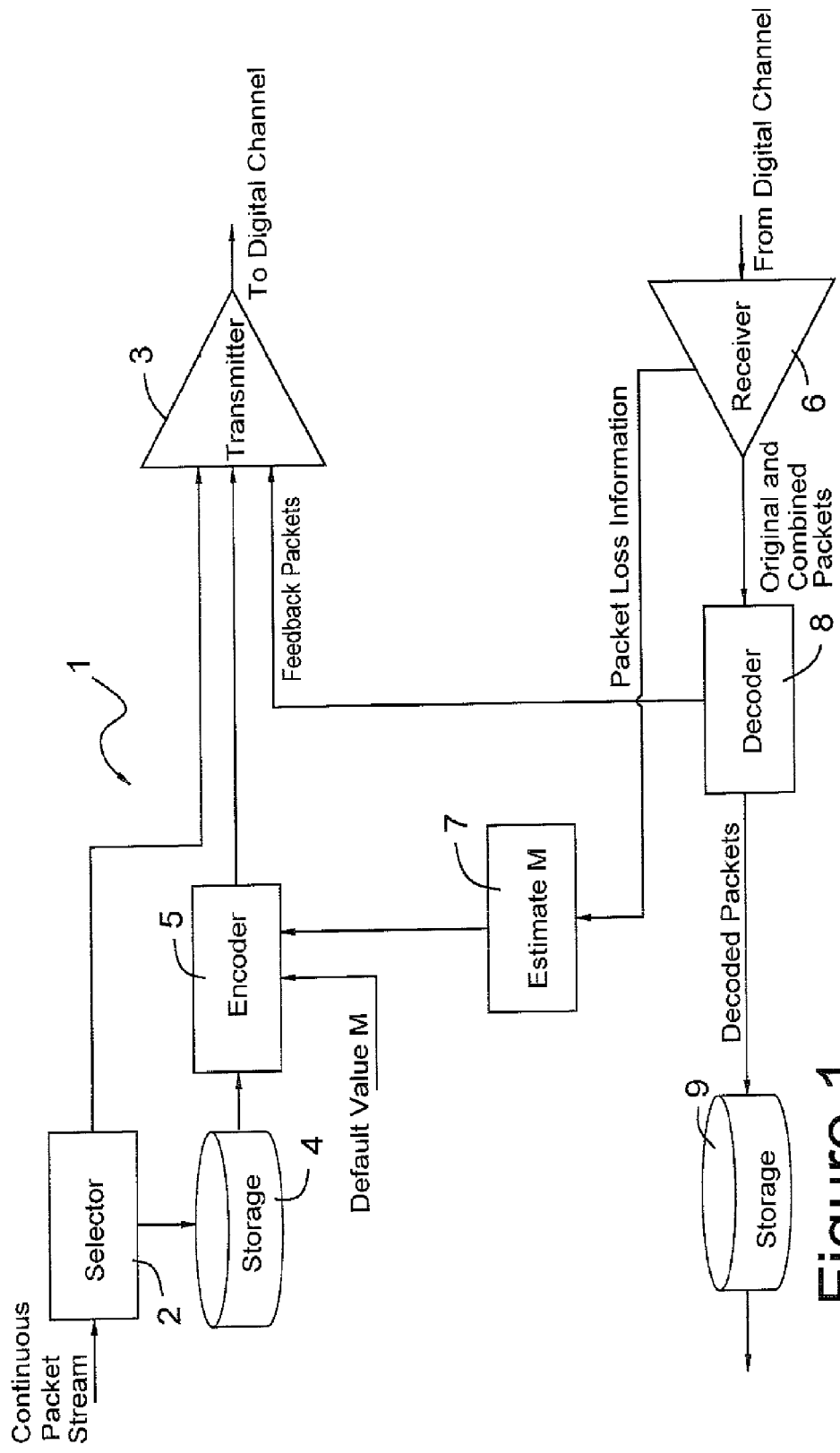
FIG. 1 shows a preferred embodiment of a system using Applicant's packet recovery protocols.
Figure 2:
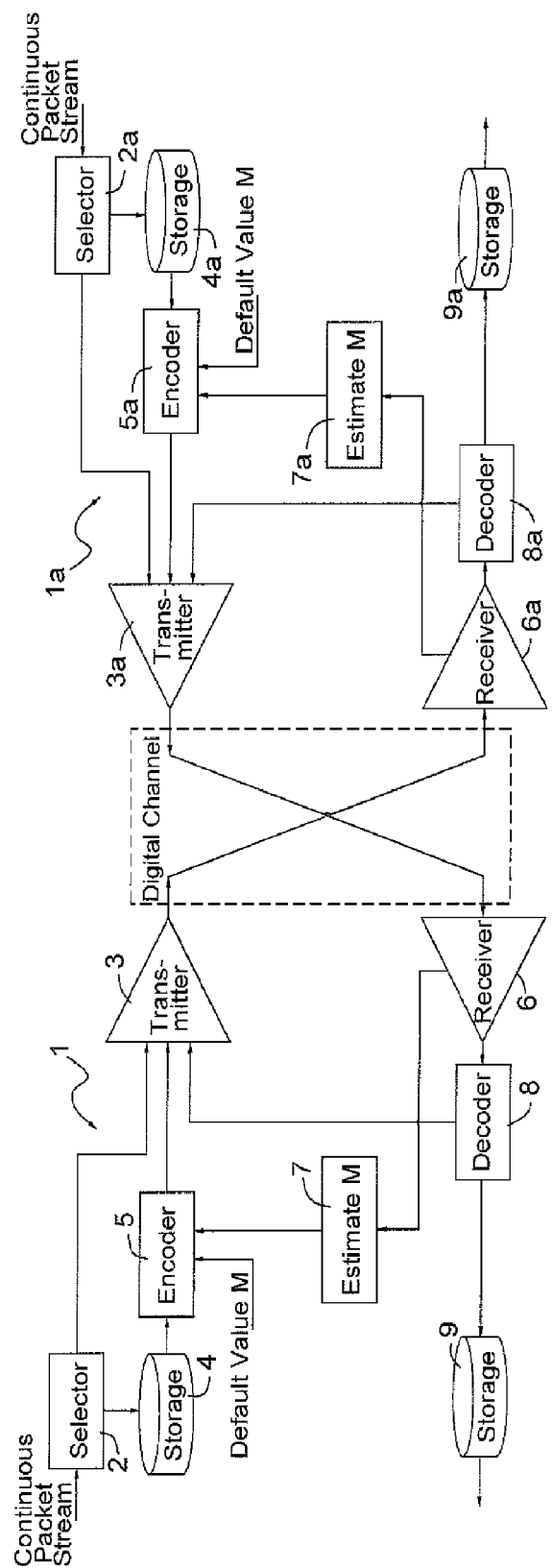
FIG. 2 shows a preferred embodiment of a data communications system using Applicant's packet recovery protocols implemented using a pair of transceivers of the type illustrated in FIG. 1.

Referring to FIG. 1, a transmitting transceiver 1, enabling for example full duplex communication with a receiving transceiver, such as transceiver 1a in FIG. 2, constructed in accordance with the present invention is illustrated. Transceiver 1 comprises a selector 2, which receives an input comprising a continuous packet stream to be transmitted over a digital channel, such as the Internet. The packet stream comprises a series of data packets. These data packets are received by selector 2 which, after an optional minimal latency interval adjusted to accommodate the time needed for erasure coding, as described below, passes an initial block of data packets, comprising a predetermined number of packets N, to a transmitter 3 for transmission over the digital channel.

In accordance with a preferred embodiment of the present invention, a block of N data packets is sent from a transmitting transceiver to a receiving transceiver. The system also transmits a number of coded packets. Generally, the N data packets contain all the information in the particular block being transmitted, then all of the blocks together represent the total information to be transmitted during any given segment, which may represent a music track, video, document, image or other item to be moved from one point, for example connected to the Internet, to another point.

If all of the data packets in a block of data packets are received with no losses at the receiving transceiver, there is obviously no need to employ additional measures. However, typically, one or more data packets are highly likely to be lost during a particular transmission cycle.

Thus, in accordance with the application of erasure coding in accordance with the present invention, additional coded packets are transmitted along with the N raw data packets. Coded packets are packets that are generated from the N raw data packets to be transmitted in accordance with the encoding algorithm of the particular erasure coding method being used. Accordingly, at the transmitting side of the data communications channel a block of N data packets is input into an encoding algorithm that generates a desired number of coded packets.

At the receiving transceiver on the receiving side of the data communications channel, the raw data packets received and the coded packets received are input into the decoding algorithm if the coding method is used. The algorithm then outputs reconstructions of the original raw data packets that were lost during the transmission of the N raw data packets. The received raw data packets, $N_r$, received by the receiving transceiver, are then interleaved with the reconstructed data packets $N_a$, generated by the decoding algorithm, to assemble a faithful reproduction of the original stream of N raw data packets transmitted by the transmitting transceiver.

Forward error correction in the form of erasure coding is facilitated by storing the initial block of raw packets N in a memory 4 of the transceiver illustrated in FIG. 1. Erasure coding is implemented by encoder 5 which generates $M_0$ coded packets. $M_0$ is the initial number of coded packets to be sent along with the data packets, and is equal to a default value for M, which may be arbitrary, but is preferably set on the basis of the expected quality impairment or range of likely vulnerabilities of the expected transmission channel. Coded packets are generated to enable the replacement of lost packets in connection with packets recovered by the particular erasure coding scheme being used. Using an erasure coding methodology of the type referenced below, the coded packets are used to generate lost packets.

It is also noted that other forward error correction schemes, such as Reed Solomon encoding may also be used in accordance with the present invention. Other suitable erasure coding schemes are well known in the art and may be employed in the present invention.

In a possible application using the system of FIG. 1, the number of raw packets N may be, for example, 100. In such an application, one might typically encounter a level of reliability of 98% in the channel. This would render likely the successful transmission of all 100 data packets by transmitting two coded packets (M=2) with the 100 data packets. Each of the two coded packets are generated by encoder 5, resulting in a total of 102 packets for transmission. However, to err on the side of reliable reception, a default value for $M_0$ (to be employed when the transmission begins) may be set relatively high, for example at five coded packets, corresponding to a 5% (M/N) loss.

This default value is used by encoder 5 to generate five coded packets which are output to transmitter 3. In accordance with a preferred embodiment of the invention, as soon as the five coded packets have been generated by encoder 5, with an optional minimal latency delay, these five coded packets are transmitted via transmitter 3 following the transmission by transmitter 3 of the 100 data packets. Thus, the system has transmitted 105 packets, comprising 100 data packets and five coded packets.

The nature of a digital channel (for example, a TCP/IP channel) is such that only good usable data packets are received. Errors accordingly take the form of missing packets. At the receiving end of the transmission line of the 100 data packets, all the data packets received are counted and the number of data packets received at the other end of the digital communications channel is transmitted back to the receiver portion 6 of transceiver 1. This information is sent to, for example, a computing device 7, which is programmed to determine an estimate for the number M of coded packets necessary to render the transmission of all 100 data packets very likely to be successful. This information is used for two purposes, as more fully appears below, first to provide a revised value, $M_1$, for M. During the transmission of the next block of data packets, $M_1$ is used and $M_0$ (the default value) is discarded. Second, this information also tells the system how many additional packets are needed to successfully transmit the block of packets, if all data packets have not been received. As appears more fully below, these additional packets are transmitted by the system before it proceeds to the next block of data packets. It is also noted that each of these additional coded packets are all different from each of the coded packets in the initial set of coded packets. This ensures that sufficient different coded packets are available at the receiving transceiver to reconstruct lost data packets.

Various algorithms may be used to take this packet loss information and use it to determine if the value of $M_0$ (or any subsequent value of M) should be increased, decreased or left unchanged. In accordance with the invention, a re-estimation of the value of M and possible adjustment of that value is done in conjunction with the transmission of each block of data packets. This can be understood from the following examples.

For example, if the initial system setting are block=100 and $M_0$=5 assume that all 100 data packets were successfully received, and taking into account the expected quality of the digital communications channel, computing device 7 may reduce the value of M from five ($M_0$) to four ($M_1$). Thus, on the next go around the second block of 100 data packets and four coded packets generated by erasure coding by encoder 5 will be transmitted.

Successive successful transmissions of all 100 data packets in successive blocks of data from the continuous data packet stream input into selector 2 may, in accordance with an algorithm resident in computing device 7, result in successive reduction of the number M until it reaches, for example, two, if, for example, the characteristics of the digital communications channel being accessed by transmitter portion 3 are well known and not expected to be often of a quality to successfully transmit a block with only one coded packet. If the communication channel is such that better reliability may occasionally occur, computing device 7 may be programmed to periodically test the channel by reducing M to one, and keeping it at that value until there are repeated failures to successfully transmit the 100 data packets in a given block, as such repeated failures would indicate longer term degradation in the communications channel, due to any of the various factors which might cause that, such as congestion, weather, etc.

Likewise, using the same methodology, computing device 7 may accommodate reduced communications channel performance (for example a report from the remote transceiver at the other end of the communications channel that only 94 data packets were received) by increasing M, making $M_1$ equal to six, seven or even a higher value and keeping it there for an extended period of time, again periodically testing the channel to determine whether channel reliability is increasing. Naturally, testing of the channel to determine unreliability is not needed because receiver 6 will, for every transmission, indicate when fewer than the 100 data packets in the continuous packet stream are input into selector 2.

In accordance with the invention, the number of data packets received is counted at the other end of the digital communications channel utilized by transmitter 3 and that information is sent over the communications channel to receiver 6 which sends this information to computing device 7.

Likewise, considering the reception side of transceiver 1, because transceiver 1 is also receiving data transmitted in similar fashion to the above from a remote point at the other end of the communications channel, a decoder 8 is provided to count the number of good data packets received from the remote transmission point by receiver 6. The number of data packets received is then communicated by decoder 8 to transmitter 3 which sends this information to the remote transceiver at the remote transmission point at the other end of the, for example, full duplex digital communications channel used by transmitter 3 and receiver 6, as more fully appears below.

It is noted that the invention may be applied to systems in which there is complete symmetry in the information being transmitted by both communicating transceivers, or where the data loads are very asymmetrical.

As noted herein, encoder 5 implements erasure coding. Decoder 8 is programmed to receive data packets and coded packets of the type generated by encoder 5 and solve for the contents of missing data packets. In accordance with the disclosed embodiments, it is contemplated that an encoder having the same characteristic as an encoder 5 is located at the other end of the full duplex communications channel in a remote transceiver in full duplex communication with transceiver 1.

The successfully transmitted data packets received from the remote transceiver at the other end of the full duplex digital communications channel are detected by decoder 8 and sent to memory 9. When decoder 8 has determined that a complete block of data packets has been received, it communicates this information to memory 9, which may be instructed to download this information to another, optionally more permanent, location in memory or to a downstream device.

Returning to the transmission methodology, as alluded to above, occasionally, perhaps frequently, less than the 100 data packets in a particular block of 100 data packets from the continuous packet stream input into selector 2 will be received. When this occurs, in contrast to prior art, for example UDP systems, data packets are not retransmitted. In TCP systems, the raw data packets are re-transmitted.

Rather, in accordance with the invention, the number of missing data packets is communicated from receiver 6 to computing device 7, and instead of transmitting data packets an additional time, coded packets are transmitted. Likewise, if needed, coded packets are transmitted to regenerate the missing packets.

If the number of lost packets is greater than $M_0$, the delta between initial loss estimate value $M_0$ and the actual number of missing packets $M_1$ is calculated. A message is sent to the encoder to generate $M_1-M_0$ additional coded packets so that all of the missing packets can be regenerated.

As alluded to above, if a great number of data packets are missing at the other end of the channel, M would be changed, from the default estimate of five, to a relatively high number. For example, if $M_0$ were initially set at five, and it was determined that eight data packets were missing, at a minimum, it would be necessary to transmit three more coded packets, thus making for a total of eight coded packets in the initial example. In such an instance, $M_1$ would be set at eight, and the additional three coded packets which would be generated by encoder 5 and transmitted.

However, the system may initially overcompensate, for example setting M at twelve, and transmitting seven additional coded packets. In accordance with the erasure coding scheme, the additional and the original coded packets would be used together with the successfully transmitted and received data packets from the subject block of 100 data packets to generate the missing data packets.

In accordance with the erasure coding scheme, the raw packets received and the erasure coded packets received would be used together to generate missing data packets and recreate the necessary 100 data packets from decoder 8 to storage 9 which are a combination of some portion of the original data packets and coded packets.

In this manner the retransmission of large blocks of data packets multiple times is avoided.

Moving forward, $M_1$ is now the new loss estimate value. In the above example, it was eight. $M_n$ continues to adjust so that the loss estimate value for the next set of packets is based on the last value of $M_n$.

While the continuous adjustment of the loss rate value M is a preferred embodiment, it is understood that initial values of M and the adjustment of the values of M can be varied according to user need. If desired, the initial loss estimate may be set at zero packets so that the initial loss estimate is not set until there is packet loss.

It is further noted that coded packets may not be successfully received and it then becomes necessary to generate and transmit replacement coded packets. The generation of the replacement-coded packets is determined by the particular forward error correction or erasure coding scheme being used. Decoder 8 accordingly functions to determine whether data packets or coded packets have been lost, based on information provided to receiver 6 by the portion of the transceiver, at the other end of the full duplex communications channel, which performs the function of decoder 8.

Turning to FIG. 2, a data communications system comprising transceiver 1 and a remote transceiver 1a, is illustrated. Transceiver 1a is substantially identical to transceiver 1. Transceiver 1a comprises a selector 2a, a transmitter 3a, a memory 4a, an encoder 5a, a receiver 6a, a computing device 7a, a decoder 8a and a memory 9a, which, respectively, operate and cooperate with each other in the manner of selector 2, transmitter 3, memory 4, encoder 5, receiver 6, computing device 7, decoder 8 and memory 9 in transceiver 1. Transceivers 1 and 1a are coupled to each other over a digital channel, as illustrated with transceiver 1a receiving signals transmitted by transceiver 1, and with transceiver 1 receiving signals transmitted by transceiver 1a.

Figure 3:
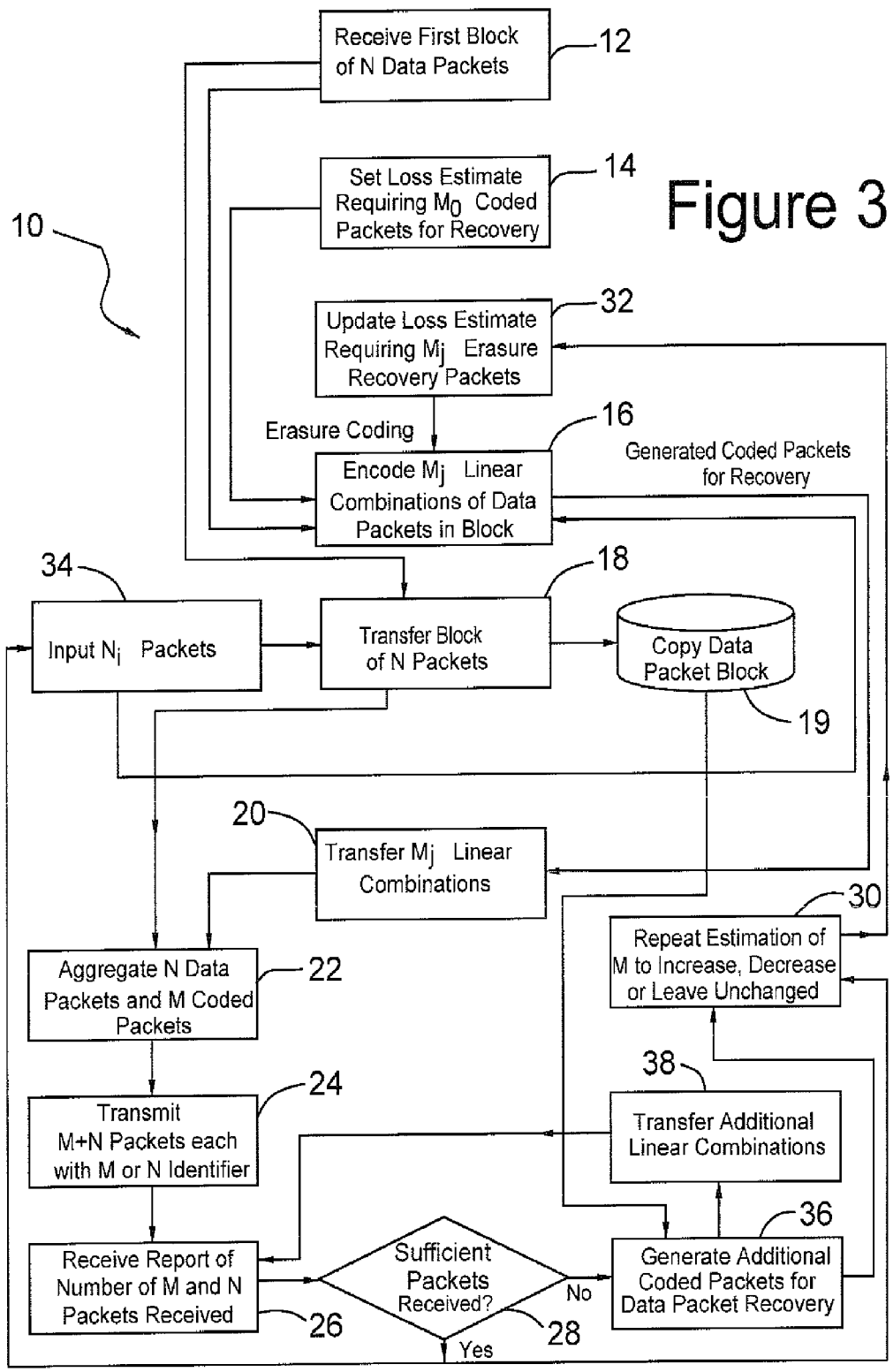
FIG. 3 shows a preferred embodiment of the inventive method as may be implemented on the apparatus of FIG. 1.

With reference to FIG. 3, the inventive method 10 may be understood in terms of processing steps which may be implemented as software on a general-purpose computer. The input to the system is a continuous sequence of data packets which may be framed into windows of N data packets each. These N data packets are received on the system implementing method 10 at step 12. In accordance with the invention, these N data packets are transmitted to a remote point over a digital data communications channel. When the inventive method is initiated, the system implementing the inventive method first employs a default loss estimate which assumes that $M_0$ data packets out of the N data packets will be lost. M may be expressed as zero or a larger integer, such as 3 or 5, or may be specified as a percentile fraction of a block of packets and rounded to an integer after calculating the number of packets by the software. At step 14, this estimate is provided to the encoding algorithm of the erasure coding algorithm being employed. More particularly, at step 16, a computing device programmed with the erasure coding algorithm associated with the particular erasure coding scheme is implemented to generate coded packets which, at the receiving transceiver may be used to perform the function of reconstructing lost packets. More particularly, in accordance with a preferred embodiment, the received data packets and the associated coded packets are input into a decoding algorithm at the receiving transceiver to generate the lost data packets. At step 16, erasure coding is performed in accordance with the selected erasure coding scheme resulting in the generation of coded packets which may be used to reconstruct any data packets lost during transmission, provided that sufficient coded packets and data packets have been received to allow such reconstruction.

When the coded packets have been generated, the data packets are transferred at step 18 to a temporary memory sector for temporary storage. A copy of the block of N data packets is preferably stored at step 19 for future use in the event that packet loss exceeds the number of lost packets sufficient for all lost packet to be recovered the erasure code decoding algorithm at the remote transceiver receiving the data being transmitted. Likewise, coded packets generated at step 16 are transferred at step 20 to a temporary memory sector, also for temporary storage. At step 22, the data packets and the coded packets are downloaded from temporary memory, and are all transmitted at step 24 to a receiving transceiver at a remote point for reception. In accordance with a preferred embodiment, when the data packets and the coded packets are transmitted at step 24, each data packet and coded packet has an identifier indicating whether it is a data packet or a coded packet.

At step 26, the transceiver receives a report indicating how many of the N data packets were lost ($N_L$).

As will be discussed below, if $N_R$ is less than N, it is then necessary to transmit a number of supplemental coded packets $P_s$ where $P_s$ is defined by the equation:

$$P_s = N_L - M_0.$$

In accordance with the invention, it is noted that the total number of supplemental packets $P_s$ is determined by the total number of packets lost regardless of whether they are data packets or coded packets. However, regardless of whether the losses are data packets, coded packets, or a combination of data and coded packets, only coded packets are transmitted to the remote transceiver. A computing device, associated with the receiving transceiver, equipped with the decoding algorithm for the particular erasure coding scheme being used, then takes the received data packets and the requisite number of coded packets and executes the decoding algorithm to reconstruct the data packets which were not received. The decoding algorithm, by processing the received data packets and the received coded packets, calculates the informational content of the lost data packets.

Returning to the data communication transmission methodology illustrated in FIG. 3, at step 28 the report communicating the number of packets lost is received by the transmitting transceiver and the decision is made as to whether further coded packets are required. More particularly, if all data packets and all coded packets have been received (or if the remote transceiver has received enough data packets and coded packets to reconstruct the lost data packets), the system proceeds to step 30, where M is estimated and updated in view of the history of packet loss, and optionally transmission channel characteristics. As alluded to above, M may increase, decrease, or remain the same. The new value of M, $M_j$, is calculated at step 30 and at step 32 any previous value of M is replaced by the new value of M.

The system then proceeds to step 34 where the next block of N packets is input into the system. At step 16 this next block of N packets is processed using the encoding erasure code algorithm to generate a number of coded packets $M_j$ (as updated at step 32), which constitute a next set of coded packets. The next set of coded packets and the next block of N packets are then transmitted in accordance with the methodology described above. However, if, at decision step 28 sufficient data packets and coded packets to reconstruct all data packets have not been entirely received by the remote transceiver, additional coded packets need to be sent to the remote transceiver. Accordingly, the system proceeds to step 36, where the required number of replacement data packets (based on the report of step 26) are generated. The supplemental coded packets are generated using the original raw data packets stored at step 19. The supplemental coded packets are all different from previous coded packets associated with the current data packet block. The number of replacement data packets is equal to the number of coded packets needed to reconstruct lost data from the received data packets. In accordance with a preferred embodiment, an erasure coding scheme in which the number of coded packets must be equal to or greater than the number of lost data packets is used.

As alluded to above, if the number of lost packets $P_L$ is greater than the previous estimate for M ($M_{previous}$), it is then necessary to transmit a number of supplemental coded packets $P_s$ where $P_s$ is defined by the equation:

$$P_s = P_L - M_{previous}.$$

Accordingly, the system returns to step 30, where it increases the estimated value of M to $M+P_s$.

The system also proceeds to step 38 where the supplemental coded packets generated at step 36 are transmitted to the remote transceiver. The system then receives a report from the remote transceiver indicating whether the packets have been successfully received, and then after determining the same at decision step 28, the system proceeds as described above, until the current block of N packets are all either well received or reconstructed. When this condition has been met, the system proceeds to step 34, where the system proceeds to the next block of N data packets, as described above.

The system continues to send successive blocks of N data packets as described above, until all the data packets in the data packet sequence to be transmitted have been transmitted and successfully received or reconstructed.

Referring to FIG. 3a, an alternative transmission scheme (which is embodied in software running on a general purpose computer, as are the other methods described herein) in accordance with method of the present invention is illustrated. At step 50, the system receives individual packets, for example the first packet or a subsequent packet, in a continuous packet stream. At step 52, the packet received at step 50 is stored. At step 54, the stored packet is transmitted to the remote transceiver and also encapsulated, for example by being input into the encoding algorithm of the erasure coding scheme for subsequent use in generating an encapsulated raw packet or encapsulated redundant coded packets which are to be used for reconstructing any lost packets.

At step 56, the system determines whether all the N packets in the block have been input, stored, transmitted and encapsulated. If this is the case, a complete block of N data packets has been input into the system, and generation of the coded packets may begin.

However, if, at step 56 all N packets have not been received, the system returns to step 50 and receives the next packet, repeating the sequence until the complete block of N data packets has been input into the system.

Once the complete block of N data packets has been input into the system, the system proceeds to step 58. At step 58, in accordance with a preferred erasure coding algorithm, the system generates a combined (also referred to as a "coded") packet by linearly combining the content of the N original data packets. At step 60, the combined packet generated at step 58 is transmitted, and the system proceeds to step 62 where a default value for M is set equivalent to or greater than the expected number of packet losses for a single block of data packets. At step 64 the system then determines whether all M coded packets have been generated and transmitted. If all M data packets have not been set at step 64, the system proceeds to step the 58 where another coded packet is computed for transmission to the remote transceiver.

If the M data packets have been generated, it is reasonably certain that sufficient information has been received by the receiving transceiver. However, at step 66 the system provides reliability by waiting to receive a report from the remote receiving transceiver that a sufficient number of packets have been received to allow reconstruction of all N data packets transmitted by the system. If the number of packets K that have been received is smaller than the number of raw packets N which were sent, there are not enough packets at the receiving transceiver to reconstruct all of the N original data packets which may have been lost during the transmission. Accordingly, the system proceeds to step 70, where M is updated to a higher number, for example the original value of M plus one (if only one combined or coded packet is necessary to generate the lost data packets, or by a greater number if that is required). For example, if five additional coded packets are required, M may be increased by five. Thus, M may be updated to a value equal to M+(N-K).

In addition to setting the value of M to reflect experienced poor transmission characteristics for the digital channel being used, it is necessary to generate and transmit sufficient number of coded (i.e. combined) packets to reconstruct the lost data packets. This is done by the system returning to step 58 where the additional coded packets are generated, and are then transmitted and have their receipt confirmed by the receiving transceiver, if they have been received.

If, at step 68, the total number of packets received by the receiving transmitter is not less than N, sufficient number of packets have been received to reconstruct all missing data packets, and the system may proceed to step 50, where transmission of the next block of data packets proceeds as detailed above. This is repeated until all blocks of data packets in the transmission and all their constituent data packets have been transmitted and successfully received or reconstructed.

Figure 4:
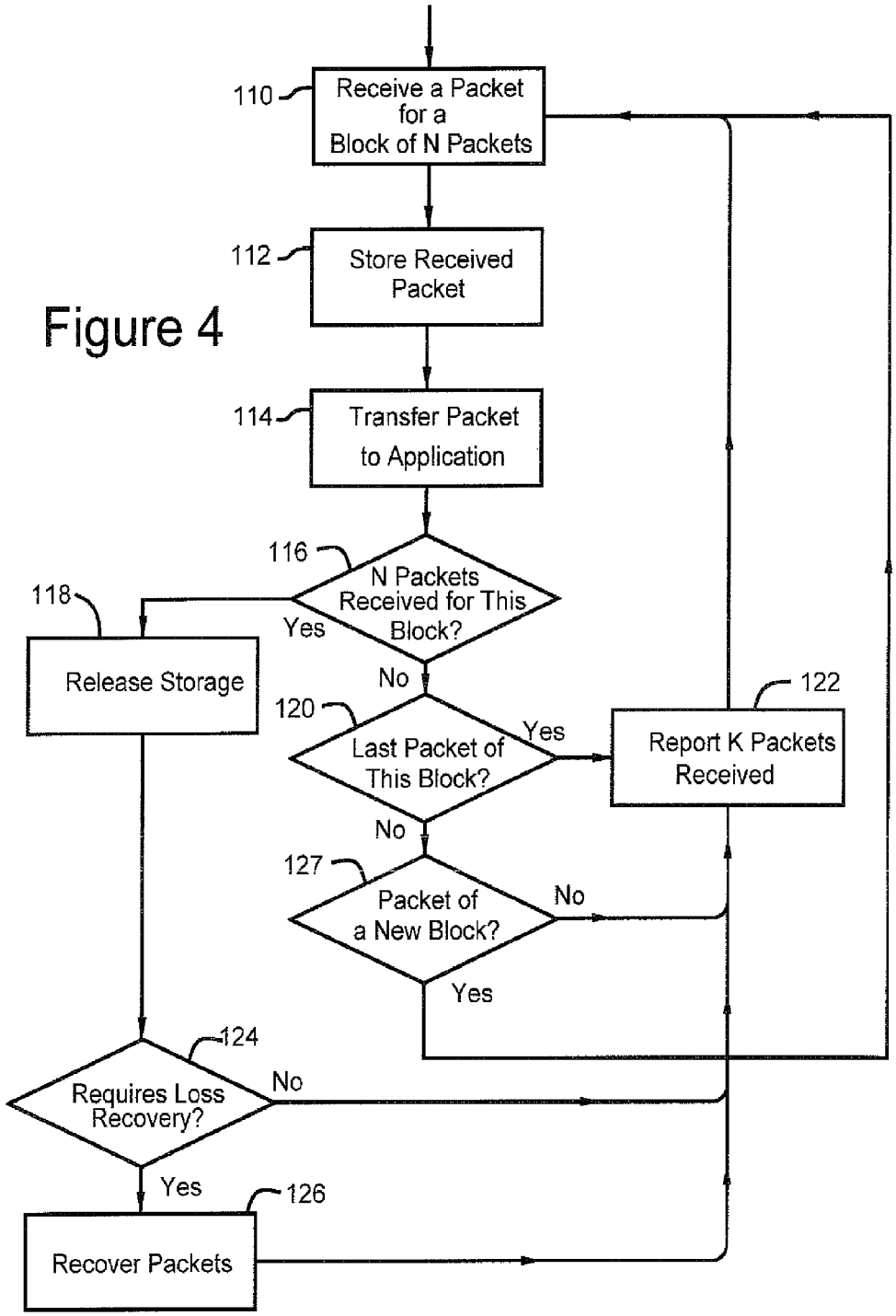
FIG. 4 shows a an alternative embodiment of the inventive method as may be implemented on the apparatus of FIG. 1.

In accordance with a receiving methodology that may be employed in accordance with the present invention, as generally illustrated in FIG. 4, at step 110 a packet is received from the transmitting transceiver. At step 112 the received packet is stored. The system then proceeds to step 114 where the received packet is transferred to the application receiving the download. The system then proceeds to step 116 where, if N packets (that is to say the entire block) have been received, the system proceeds to step 118 where the stored packets are released. Because N packets have been received, no loss recovery is required, as is determined at step 124, and the system reports that the received number of packets K is equal to N at step 122.

If, at step 116, N packets have not been received, the system proceeds to step 120 where it is determined whether the last packet of the received portion of the block of N packets has been received. If less than N packets have been received but the last packet in the block has been received, packets have been lost and that is the reason why fewer than N packets have been received. The received number K of packets is then reported to the sending transceiver at step 122, and replacement coded packets are sent by the sending transceiver.

The replacement coded packets are received at step 110 and processed in accordance with the above methodology until the system at step 116 determines that sufficient packets have been received to allow reconstruction. The system then proceeds to step 118 where the packets are released from storage. At step 124 the system would determine whether lost packets must and can be recovered. Recovery is executed at step 126. This is reported to the sending transceiver at step 122.

If, at step 120, the last packet of the block has not been received, the received packet is either another, for example, packet in the current block or a packet from a new block of data packets. If it is not a packet from a new block, at step 127 the system proceeds to step 122 where the total number K of packets received is reported as above. If however, the packet is from a new block of data packets, the system proceeds to step 110 where it continues to receive packets in the new block.

Figure 4A:
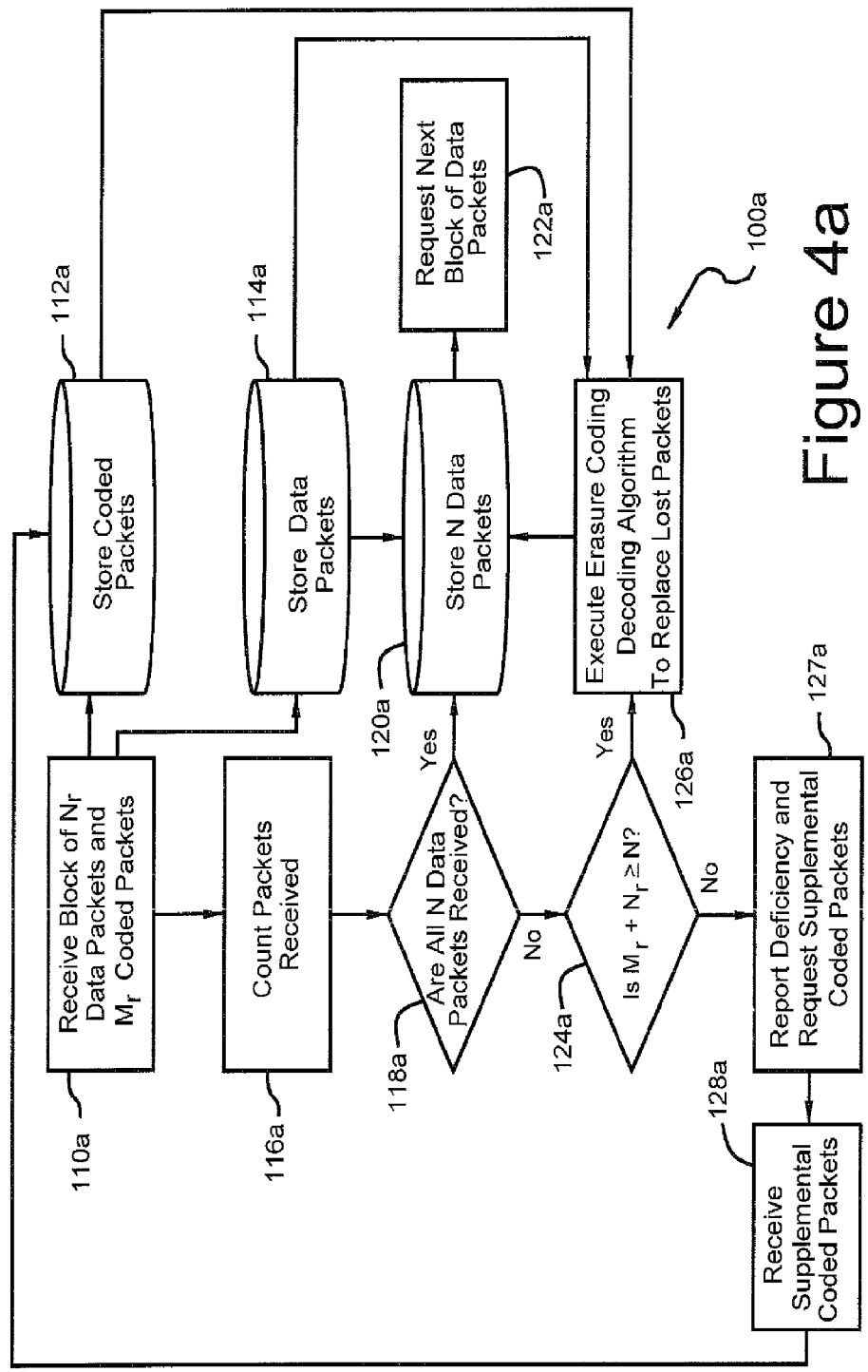
FIG. 4a shows an alternative embodiment of a data receiving methodology as may be implemented in conjunction with the data transmission methodology of FIG. 3.

Referring to FIG. 4a, an exemplary alternative embodiment of a data receiving methodology 100a in accordance with the inventive method is illustrated. At step 110a, in response to the transmission over a digital communications channel, such as the Internet, of a block of N data packets and M coded packets (for example as provided by the method of FIG. 3), a receiving transceiver receives $N_r$ data packets and $M_r$ coded packets constituting some or all of the block of N data packets and M coded packets originally transmitted by a transmitting transceiver (for example, a transmitting transceiver operating in accordance with the methodology of FIG. 3).

Upon reception, coded packets, generated by the sending transceiver system to be used to replace the missing data packets in accordance with the particular erasure coding algorithm being used by the system, are stored at step 112a. Similarly, also upon reception, data packets may be stored at step 114a. Coded packets and data packets are both coded in their header to have an indicator indicating whether they are coded packets or data packets.

At step 116a, the receiving transceiver system counts the number of data packets which have been received $N_r$ and the number of coded packets which have been received $M_r$. At step 118a the receiving transceiver determines whether all data packets have been received. If this is the case, the system proceeds to step 120a, where the N data packets, stored at step 114a, are downloaded to a memory which performs the function of accumulating all data packets, whether they are received or whether they are first lost during an initial transmission of a block of data packets and then reconstructed using, for example, the received data packets and the coded packets, for example in accordance with the algorithm specified above or an alternative erasure coding methodology.

At step 122a, the system then confirms receipt and or reconstruction of the first block of N data packets and requests the next block of N data packets by sending this information to the transmitting transceiver.

If all of the transmitted N data packets are not received, at step 118a the system proceeds to step 124a where it is determined whether the number of data packets received with the number of coded packets received allows reconstruction of the lost data packets in accordance with the particular erasure coding method being used. More particularly, if the number of data packets received added to the number of coded packets received is greater than or equal to the number of data packets in the current block, the system has sufficient information to use the erasure coding algorithm specified above to reconstruct lost data packets using the decoding algorithm associated with the particular erasure coding methodology being employed.

This decoding algorithm is then executed at step 126a, resulting in generation of all data packets which were lost during the initial transmission of the block of N data packets.

More particularly, the original raw data packets stored at step 114a and the coded packets stored at step 112a are input into the decoding algorithm at the receiving transceiver. The decoding algorithm is then used to compute the contents of the lost packets and generate reconstructions of the same.

The reconstructed data packets generated using the erasure coding scheme's decoding algorithm executed at step 126a are then combined with the data packets stored at step 114a to form a complete set of N data packets having the informational content of the block of N data packets originally sent by the transmitting transceiver at the other end of the digital data communications channel. The system then proceeds to store the reassembled block of N data packets (comprising data packets which were well received and data packets reconstructed using the decoding algorithm associated with the erasure coding scheme) at step 120a and request the next block of data packets in the data sequence at step 122a.

If, at step 124a, the receiving transceiver determines that it does not have enough coded packets to reconstruct the lost data packets, the system proceeds at step 127a to request additional coded packets. The request is sent to the transmitting transceiver, and at the transmitting transceiver, the erasure coding and coding algorithm is used to generate additional coded packets which are different from all of the previously generated coded packets associated with the current block of N data packets.

At step 128a, supplemental packets received by the receiving transceiver from the transmitting transceiver are again tested for sufficiency at step 124a, where the system determines whether all the well received data packets and the received coded packets (including those received in the initial transmission with the $N_r$ received data packets in the initial transfer of information in the current block) are sufficient to allow reconstruction of the lost data packets. If such is the case the system can proceed to step 126a, otherwise it must repeat the cycle (steps 127a and 128a) of requesting and attempting to receive the required data packets.

While, in accordance with the embodiment of the transmitting methodology illustrated in FIG. 3, the decision respecting the number of coded packets to be sent is made at the transmitting transceiver, it is also possible for this decision to be made at the receiving transceiver.

A preferred embodiment of Applicant's proprietary DPR™ Protocol as described in connection with FIGS. 1-4 for ensuring complete packet block reception without retransmission of data packets, is the use of DPR™ Protocol in a proxy based system.

A transparent proxy intercepts normal communication at the network layer without requiring any special client configuration. Clients need not be aware of the existence of the proxy. A transparent proxy is normally located between the client and the Internet, with the proxy performing some of the functions of a gateway or router. A transparent proxy is a proxy that does not modify the request or response beyond what is required for proxy authentication and identification. A non-transparent proxy is a proxy that modifies the request or response in order to provide some added service to the user agent, such as group annotation services, media type transformation, protocol reduction, or anonymity filtering. A type of non-transparent proxy that may be used is a SOCKS proxy. SOCKet Secure (SOCKS) is an Internet protocol that routes network packets between a client and server through a proxy server. SOCKS5 additionally provides authentication so only authorized users may access a server. Practically, a SOCKS server will proxy TCP connections to an arbitrary IP address as well as providing a means for UDP packets to be forwarded. SOCKS performs at Layer 5 of the OSI model—the session layer (an intermediate layer between the presentation layer and the transport layer).

1. Typical Topology

Figure 5:
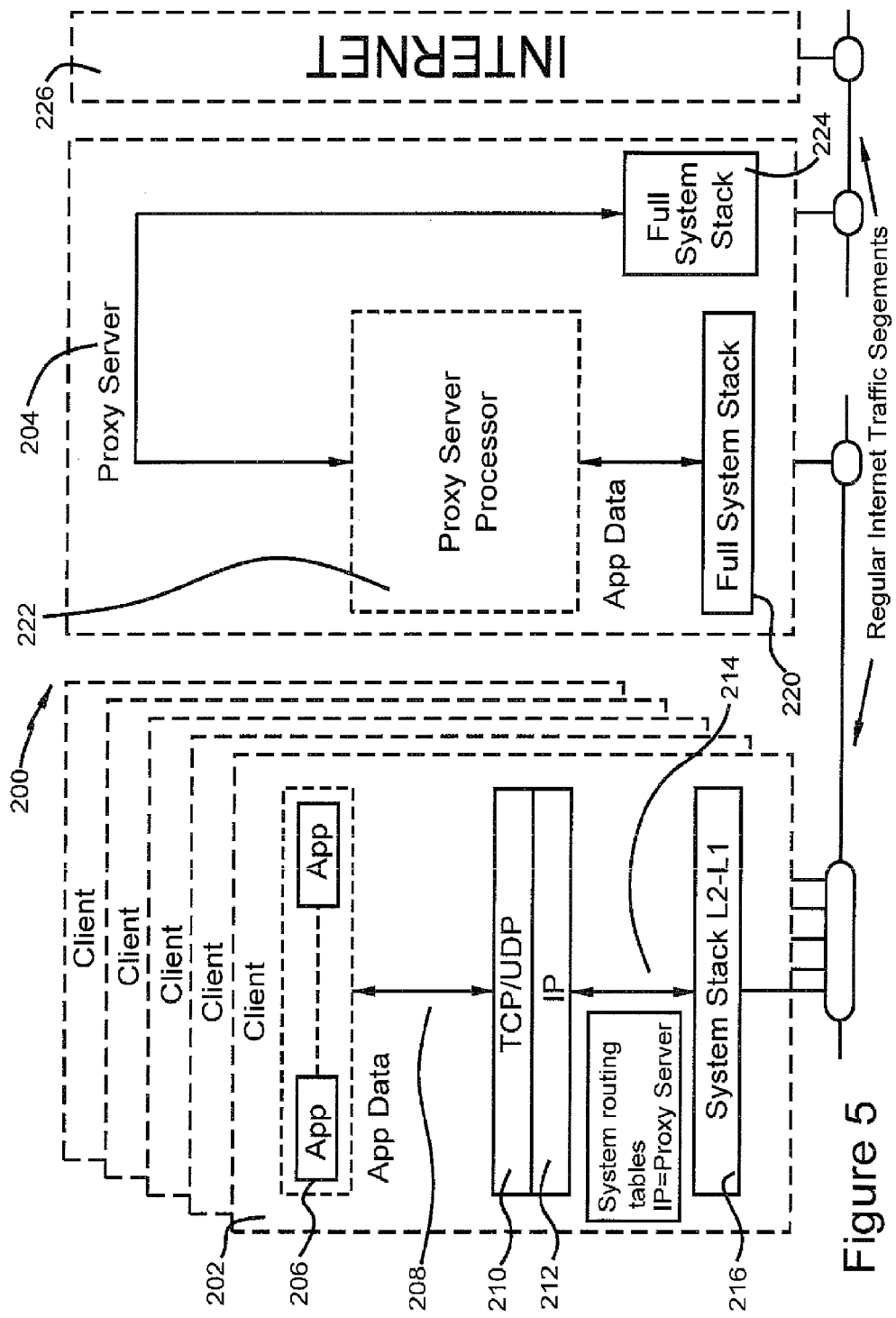
FIG. 5 shows a typical network configuration/system architecture where a proxy server is used.

FIG. 5 shows the typical network configuration of a system 200 where a network proxy is used. System 200 comprises one or more client devices 202, logically connected to a proxy server 204 positioned anywhere in the Internet infrastructure to communicate with the Internet. Each client device 202 comprises/includes one or more applications 206 which send data packets 208 via TCP/UDP sockets 210 through the IP layer 212 which then sends data packets 214 through system stack (L2-L1) 216 where L4 is TCP/UDP and L3 is IP. Applications 206 running on client devices 202 communicate with proxy server 204 via the standard system stack (L4-L1) comprising elements 208, 210 and 216.

Proxy server 204 also comprises a standard system stack 220 that receives data packets 208 and sends them through the proxy server processor 222 to the outgoing full system stack 224 to the Internet 226. All connection and functions are bi-directional. There are no special requirements for the location of proxy server 204. It can be positioned as a forwarding proxy or reverse proxy, i.e. performing functions for a multitude of clients or delivering special functionality to a multitude of servers or any combination of the above.

In a preferred embodiment of the invention, for UDP traffic, packets are coded within a fixed "generation" size. Raw packets are sent followed by coded packets. Feedback is triggered by 1) a timer signal, 2) the last packet of current generation come or 3) a packet of a new generation.

Figure 6:
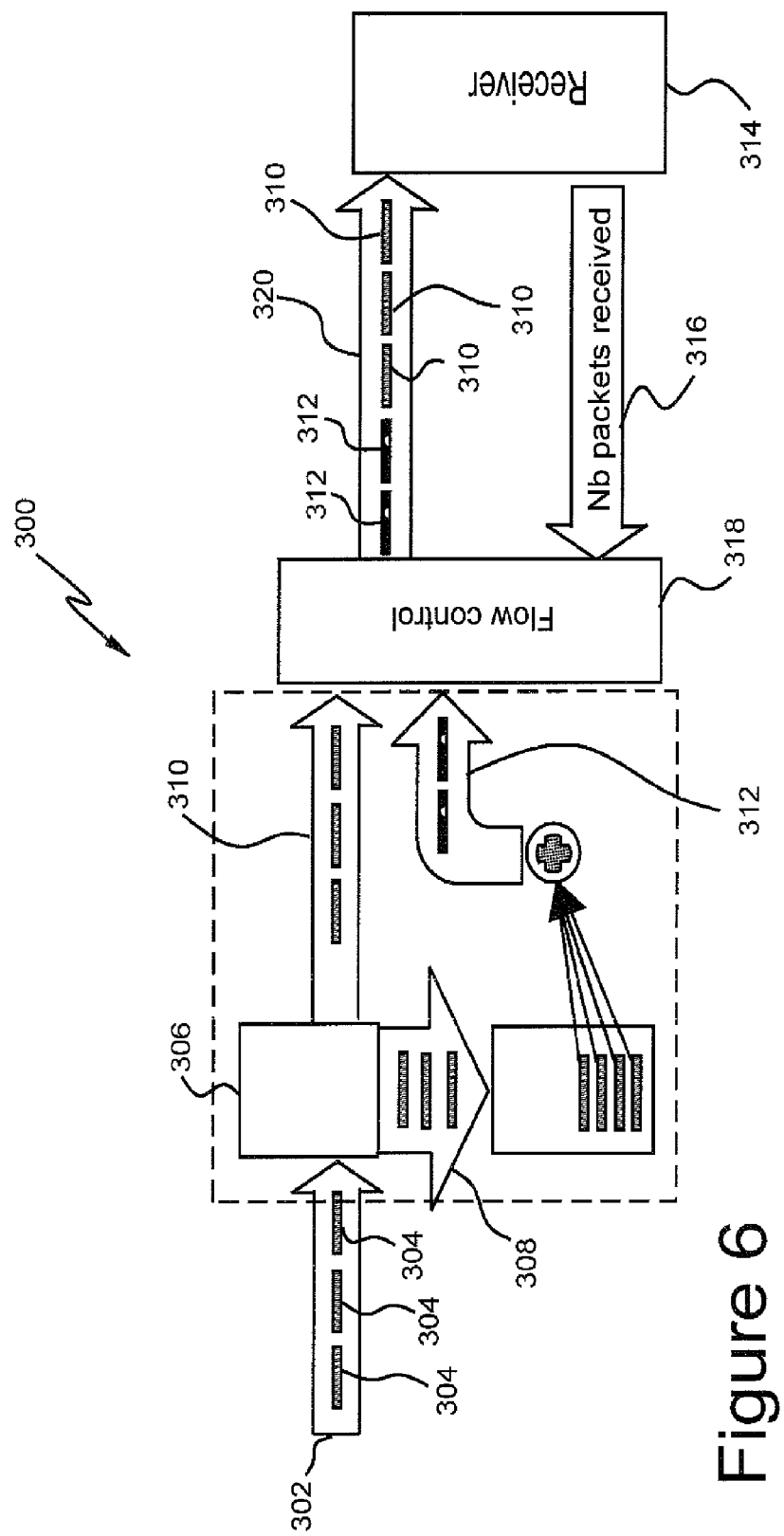
FIG. 6 shows applicant's proprietary DPR™ protocol transmission mechanism.

FIG. 6 shows a preferred embodiment of applicant's proprietary DPR™ protocol transmission mechanism 300. Coding is performed over a fixed size group 302 of raw packets 304 called a "generation". Each generation is assigned a sequence number $G_i$ referred to as "generation ID." $N_b$ denotes the number of packets in a generation, and $N_r$ denotes a fixed amount of redundant packets generated for each generation.

The generation of raw packets 302 is copied at function block 306 to make a duplicate generation 308 of each incoming packet. Raw packet generation 302 is then passed through fixed size generation buffer ($G_i$) 310 and forwarded to transmitter flow control 318. After $N_b$ packets have been accumulated, a predefined number of redundant packets ($N_r$) 312 is computed using erasure coding on generation 308 and forwarded to transmitter flow control 318. Transmitter flow control 318 sends the $N_b$ raw packets 310 followed by $N_r$ coded packets 312 which forms a digital communications channel 320 to receiver 314. Generation $G_i$ of raw packets 308 is retained until the receiver 314 confirms reception of $N_b$ packets 316. Receiver 314 ACKs (acknowledges) reception of $N_b$ packets 316 received by the time when the end-of-block packet or the packet that belongs to a different block is received. If less than $N_b$ packets were ACKed, the transmitter 318 computes a balance of coded packets 312 needed to completely send Generation $G_i$ packets and sends them to the destination.

Figure 7:
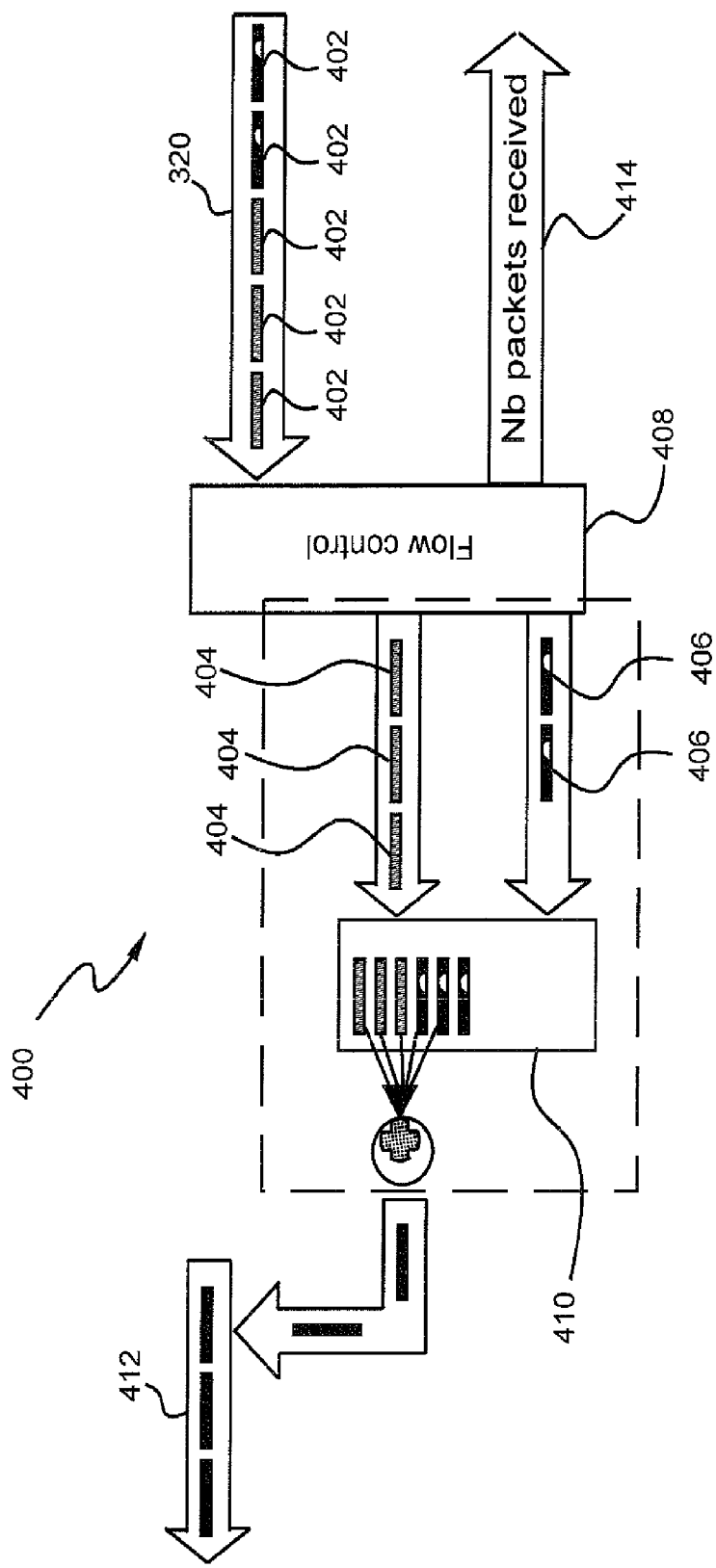
FIG. 7 shows applicant's proprietary DPR™ protocol reception mechanism.

FIG. 7 shows the packet reception mechanism 400 used in connection with communications channel 320. Packets 402 are received from channel 320. Packets 402 are separated and split into raw packets 404 and coded packets 406 by flow control block 408. Packets 404 and coded packets 406 are sent to an erasure decoding block 410. There are three possible cases. In the first case, if $N_b$ raw packets are received; then the raw packets 404 are sent without further processing to the function output 412. In the second case, where less than or equal to $N_r$ packets were lost, i.e. $N_{RAW}+N_r>=N_b$, then the combination of raw packets 404 and coded packets 406 are decoded via erasure decoding block 410 and then sent to the function output 412. In the third case, where more than $N_r$ packets were lost, i.e. $N_{RAW}+N_r<N_b$, an ACK is sent from flow control 408 to transmitter flow control 318 requesting additional coded packets. When additional packets 402 are received by channel 320, flow control 408 will send the additional coded packets 406 to erasure decoding block 410. When the full generation size $G_i$ is recovered, then the combination of raw packets 404 and coded packets 406 are decoded via erasure decoding block 410 and then sent to the function output 412.

Figure 8:
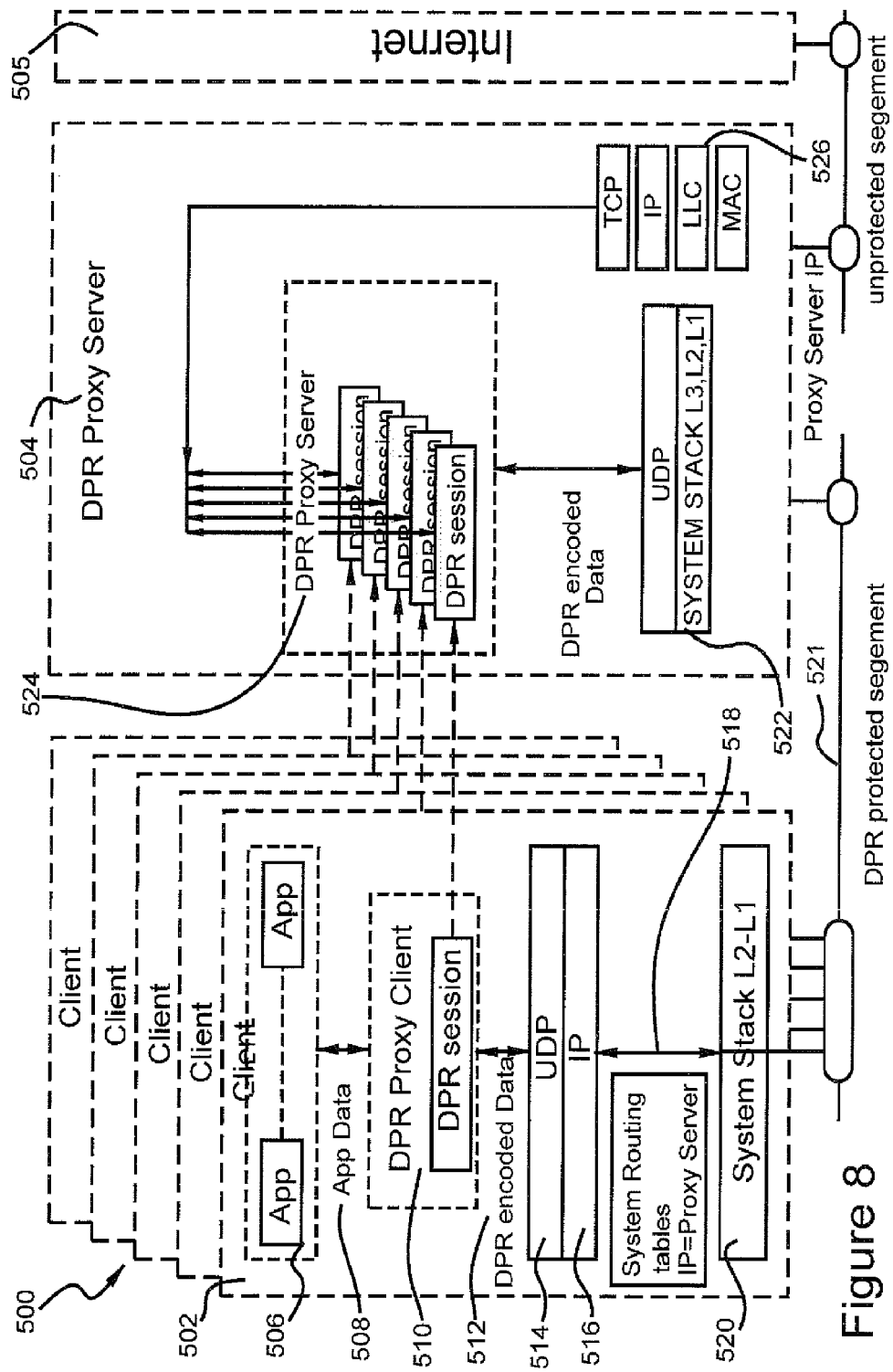
FIG. 8 shows an overview of a preferred embodiment of the present network configuration using the DPR software local architecture for local and remote DPR software entities respectively.
Figure 9:
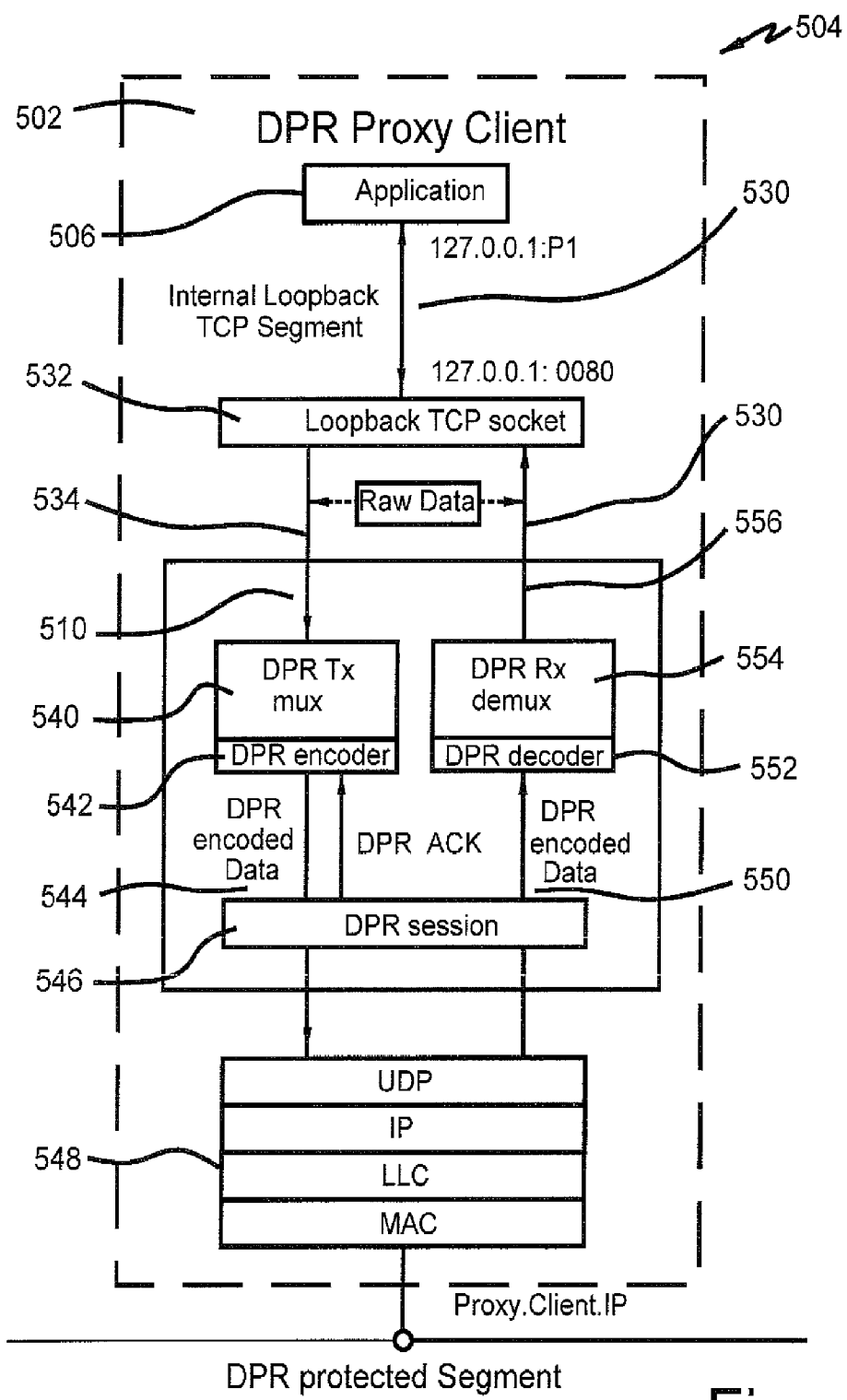
FIG. 9 shows a preferred embodiment of FIG. 8 of a high level DPR software architecture on the local client side.
Figure 10:
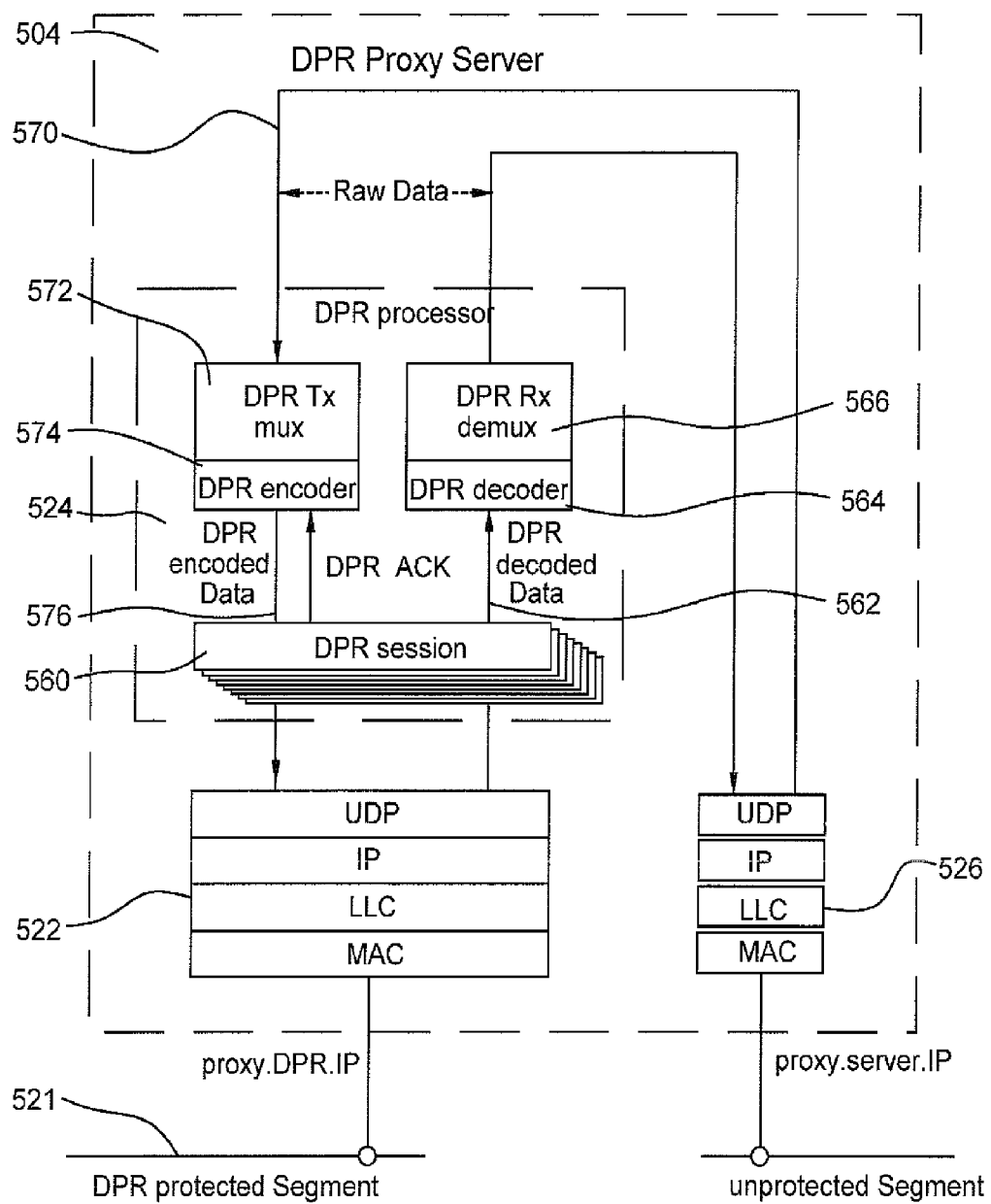
FIG. 10 shows a preferred embodiment of FIG. 8 of a high level DPR software architecture on the remote proxy side.

FIGS. 8-10 show high level software architecture for a system 500 for local DPR clients 502 and a remote DPR enhanced Proxy Server 504. Similar to the system shown in FIG. 5, system 500 comprises one or more client devices 502, logically connected to proxy server 504 positioned anywhere in the Internet infrastructure to communicate with the Internet 505. Each client device comprises or includes one or more applications 506 that send data packets 508 to a DPR proxy client 510 located within client device 502. Client 510 will send DPR encoded data 512 to UDP sockets 514 through the IP layer 516 which then sends IP data packets 518 through system stack (L2-L1) 520 to produce packets 521. Applications 506 running on client devices 502 communicate with DPR proxy server 504 sending the packets 521 through a DPR protected segment using the DPR protocols as described above.

DPR enhanced proxy server 504 also comprises a standard system stack 522 that receives DPR data packets 521 and sends them through the proxy server processor 524 (described in detail below) to the outgoing full system stack 526 to the Internet 505. All connections and functions are bi-directional.

There are no special requirements for the location of proxy server 524. It can be positioned as a forwarding proxy or reverse proxy, i.e. performing functions for a multitude of clients or delivering special functionality to a multitude of servers or any combination of the above.

However, there are specific functionalities at the client level 502 and the proxy level 504 to enhance data delivery. Each client 502 thus includes a local DPR™ mechanism 510 as described above and shown in FIGS. 1-4 and preferably FIGS. 6 and 7.

As detailed in FIG. 9, the local DPR™ proxy client 502 receives and returns data from/to local applications 506 running on the same hardware platform where the DPR™ Proxy Client 502 is installed. As shown in FIG. 10, the DPR™ Proxy Server 504 on the other hand, receives and returns data from/to the clients 502 running on the devices separate from the hardware platform where the remote DPR Proxy is installed. It also is required to create and service multiple DPR™ sessions corresponding to a number of local DPR Proxy entities that had successfully established connection with this remote DPR Proxy.

Referring to FIG. 9, a more detailed view of system 500 for local DPR client 502 is shown. Client device 502 comprises application 506. Looking at a detailed view of application data 508, it comprises TCP data 530 being sent to an internal loopback socket 532 and then data 534 is sent from socket 532 to DPR proxy client block 510.

Looking at a detailed view of DPR proxy client block 510, data 534 is sent to the DPR transmit multiplexer 540 and then to encoder 542 to produce DPR encoded data 544. Data 544 is sent to DPR Session block 546 that keeps track of the number of DPR sessions currently being processed between DPR proxy client 510 and DPR Proxy Server Processor 524.

When encoded data 544 is processed by DPR Session block 546, DPR session data 544 is sent to system stack 548 (shown in FIG. 8 as 512, 514, and 520) to produce DPR data packets 521. After DPR encoded data 544 is sent by DPR Session block 546, an ACK is sent to DPR encoder 542.

In the reverse path, DPR encoded data 521 is received by System stack 548, and then sent to session block 546 which produces DPR encoded data 550 which is sent to the DPR decoder 552. After decoding, it is sent to the DPR Rx demultiplexer 554 that produces raw TCP packets 556 which are then sent to the loopback TCP socket 532 and then sent to the application 506.

Similarly in FIG. 10, a detailed view of the DPR proxy server 504 is shown. DPR Processor 524 comprises a Multiplexing/Demultiplexing TCP session controller which is responsible for local management of the TCP sessions initiated by local applications as well as multiplexing individual TCP sessions into a single data stream for subsequent DPR™ processing on transmit. It is also responsible for de-multiplexing DPR™ decoded data stream into multiple individual TCP streams on receive.

Incoming data 521 is processed via system stack 522 and sent to the DPR Proxy Server Processor 524. DPR session management is handled in session controller block 560 which passes DPR encoded data 562 which sent to DPR decoder block 564 and then to the DPR Rx (receiving) Demux (de-multiplexer) 566, and then sent to the full output system stack 526, and then sent to the Internet 505. Session controller 560 is also responsible for establishing or disconnecting a session between client 502 and its server 504.

In the reverse path, receiving data from Internet 505 via system stack 526, TCP data 570 is then sent to the DPR processor 524 into the DPR Tx (transmitting) MUX (multiplexer) 572 and then sent to the DPR encoder 574 producing DPR encoded data 576. Data 576 is sent to DPR Session Controller Block 560. Block 560 then sends then DPR encoded data 576 to system stack 522 to produce DPR encoded packet stream 521.

Figure 11:
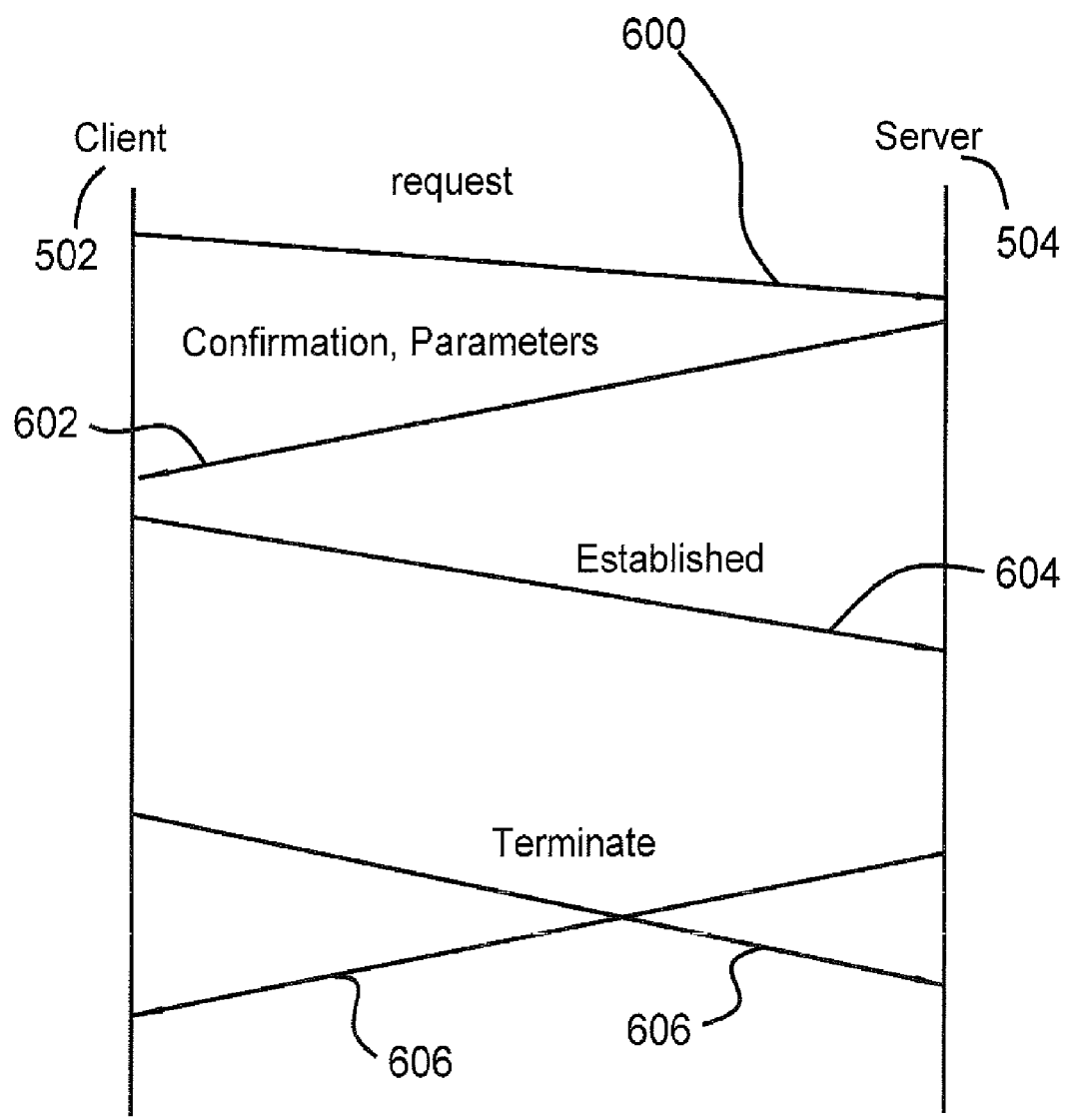
FIG. 11 shows a schematic overview of the DPR™ Connection Protocol.

Referring to FIG. 11, if a DPR™ equipped entity or client 502 (which can be among other things a mobile device, application process,) wishes to establish a DPR™ channel 521, it is required to make a connection with another DPR™ equipped device 504 (or a proxy) in a network. A connection is established using three-way handshake similar to a TCP Connection request. A request 600 is sent from client 502 to server 504. A confirmation 602 is sent from server 504 to client 502 returning link parameters. Then client 502 sends a "link established" response 604 to server 504. The connection is terminated per request of either client 502 or server 504.

Examples

Below are two examples of data packet transfer Data formats a) DPR™ session controller

```
 |7|6|5|4|3|2|1|0|
 +---------------+
 |E|C|SO|KA|M|D|A| Byte 0-Flags
 +---------------+
 | SESSION_ID 3  | Byte 1 - Session ID
 +---------------+
 | SESSION_ID 2  | Byte 2 - Session ID
 +---------------+
 | SESSION_ID 1  | Byte 3 - Session ID
 +---------------+
 | SESSION_ID 0  | Byte 4 - Session ID
 +---------------+
```

Byte 0 contains flags that define the message type according to the following assignment table:

| BIT # | ASSIGNED VALUE |
|---|---|
| 7 | RESERVED |
| 6 | ESTABLISH |
| 5 | CLOSE |
| 4 | SHUTDOWN_OUTPUT |
| 3 | KEEPALIVE |
| 2 | MESSAGE |
| 1 | DATA |
| 0 | ACK |

A session is considered established after local and remote DPR entities exchange three-way handshake as described above in FIG. 11.
1. Client sends packet with Bit6 set (ESTABLISH) and Session_ID=0;
2. Server responds with Bit6 set and newly generated Session_ID!=0; and
3. Client responds with Bit6 & Bit0 set and Session_ID just received from server.

To terminate a session, one of the participating entities—either local or remote—initiates closure by sending a packet with Bit5 set while the other end responds with Bit6 & Bit0 set and Session_ID of the session to be terminated.

In accordance with the invention, the following session controller data format is used.

```
| 7| 6| 5| 4| 3| 2| 1| 0|
+----------------------+
| Source_Port 1        | Byte 0 - Source Port
|----------------------+
| Source_Port 0        | Byte 1 - Source Port
|----------------------+
| Destination_Port 1   | Byte 2 - Destination Port
|----------------------+
| Destination_Port 0   | Byte 3 - Destination Port
|----------------------+
| | | | |CO|CL| D| A| Byte4-Flags
+----------------------+
```

Flags are defined as follows:

| Bit # | Value |
|---|---|
| 7 | Reserved |
| 6 | Reserved |
| 5 | Reserved |
| 4 | Reserve |
| 3 | CONNECT |
| 2 | CLOSE |
| 1 | DATA |
| 0 | ACK |

The session is always initiated by a client sending a packet with SRC/DST port numbers along with CONNECT flag (Bit #3) set. The server returns the same port numbers with flags CONNECT (Bit #3) and ACK (Bit #0) set. To close a session either side needs to send a message with CLOSE (Bit #2) set.

With respect to the foregoing embodiments, various modified examples are conceivable within the scope of the gist of the invention. Moreover, various modified examples and applied examples created or combined based on the disclosure of the specification are also conceivable. It should be understood by those skilled in the art that various modifications, combinations, sub-combinations and alterations may be made depending on design requirements and other factors. It should be understood that various changes and modifications to the presently preferred embodiments described herein will be apparent to those skilled in the art. Such changes and modifications can be made without departing from the spirit and scope of the present invention and without diminishing its intended advantages.

The invention claimed is:

1. A method for transmitting a plurality of blocks of data packets in a digital data sequence, comprising:
receiving at a first transceiver a first block of data packets for transmission through a data communications channel to a second transceiver;
duplicating the first block of data packets and storing the packets to make a stored copy of the first block of data packets;
transmitting the first block of data packets from the first transceiver through the data communications channel to the second transceiver;
determining a first set of coded data packets from the stored copy of the first block of data packets;
transmitting the first set of coded data packets from the first transceiver through the data communications channel to the second transceiver;
receiving an indication of whether the coded data packets received by the second transceiver are sufficient together with received data packets of the first block of data packets to reconstruct one or more lost data packets;
in the event the coded data packets received by the second transceiver are sufficient together with received data packets of the first block of data packets to reconstruct the one or more lost data packets, reconstructing the one or more lost data packets; and
in the event the coded packets received by the second transceiver are not sufficient together with received data packets of the first block of data packets to reconstruct the one or more lost data packets, transmitting a second set of coded data packets.

2. The method as in claim 1, wherein an additional set of coded data packets is transmitted until the coded packets received by the second-transceiver are sufficient together with received data packets of the first block of data packets to reconstruct the one or more lost data packets.

3. The method as in claim 1, wherein the data communications channel is the Internet.

4. The method as in claim 1, wherein a number of coded data packets in the first set of coded data packets is based at least in part on an estimated number of data packets lost during transmission.

5. The method as in claim 1, wherein coding the first set of coded data packets is performed using erasure coding.

6. The method as in claim 1, wherein coding the first set of coded data packets is performed using forward error correction.

7. The method as in claim 1, wherein in the event packet loss is greater than expected, a number of coded data packets transmitted in a first transmission of coded data packets for a second block of data packets is greater than a number of coded data packets in the first set of coded data packets for the first block of data packets.

8. The method as in claim 1, wherein in the event packet loss is equal to that expected, a number of coded data packets transmitted in a first transmission of coded data packets for a second block of data packets equals a number of coded data packets in the first set of coded data packets for the first block of data packets.

9. The method as in claim 1, further comprising: receiving with the second transceiver all or some of the first block of data packets and the first set of coded data packets from the first transceiver; counting received packets of the first block of data packets and the first set of coded data packets to generate packet loss information; and transmitting the packet loss information from the second transceiver through the data communications channel to the first transceiver.

10. The method as in claim 1, wherein the data communications channel is a full duplex communications channel.

11. The method of claim 1, wherein a number of coded data packets in the first set of coded data packets is inversely proportional to a quality or a quality score of the data communications channel.

12. The method as in claim 11, wherein the quality score of the data communications channel is assigned based on one or more of the following: a data packet loss rate, an inter data packet arrival time, or a data communicational channel round trip time.

13. The method as in claim 1, wherein a number of coded data packets in the second set of coded data packets is equal to a number of lost data packets.

14. The method as in claim 1 wherein the method comprises use of a proxy server.

15. The method as in claim 1 wherein the coded data packets are generated using one or more of the following: Reed-Solomon (RS) coding, Low Density Parity Check (LDPC) coding, Luby transform (LT) coding, Raptor coding, Network coding, or Online codes.

16. The method as in claim 1, wherein the second set of coded data packets comprises different coded data packets than the first set of coded data packets.

17. The method as in claim 1, wherein a data packet of the block of data packets or a data packet of the first set of coded data packets comprises an indication of whether it is coded.

18. The method as in claim 1, wherein in the event that a number of data packets received by the transceiver, coded or non-coded, is equal to a number of data packets in the block of data packets, the transceiver has received sufficient information to reconstruct lost data packets of the block of data packets.

19. A system for transmitting a plurality of blocks of data packets in a digital data sequence, comprising:
   a first transceiver configured to:
      receive a first block of data packets for transmission through a data communications channel to a second transceiver; and
      transmit the first block of data packets through the data communications channel to the second transceiver; and
   a processor configured to:
      duplicate the first block of data packets and storing the packets to make a stored copy of the first block of data packets;
      determine a first set of coded data packets from the stored copy of the first block of data packets, wherein the first transceiver is configured to transmit the first set of coded data packets through the data communications channel to the second transceiver;
      receive an indication of whether the coded data packets received by the second transceiver are sufficient together with received data packets of the first block of data packets to reconstruct one or more lost data packets;
      in the event the coded packets received by the second transceiver are sufficient together with received data packets of the first block of data packets to reconstruct the one or more lost data packets, reconstruct the one or more lost data packets; and
      in the event the coded data packets received by the second-transceiver are not sufficient together with received data packets of the first block of data packets to reconstruct the one or more lost data packets, transmit a second set of coded data packets.

20. A computer program product for transmitting a plurality of blocks of data packets in a digital data sequence, the computer program product being embodied in a non-transitory computer readable storage medium and comprising computer instructions for:
   receiving at a first transceiver a first block of data packets for transmission through a data communications channel to a second transceiver;
   duplicating the first block of data packets and storing the packets to make a stored copy of the first block of data packets;
   transmitting the first block of data packets from the first transceiver through the data communications channel to the second transceiver;
   determining a first set of coded data packets from the stored copy of the first block of data packets;
   transmitting the first set of coded data packets from the first transceiver through the data communications channel to the second transceiver;
   receiving an indication of whether the coded data packets received by the second transceiver are sufficient together with received data packets of the first block of data packets to reconstruct one or more lost data packets;
   in the event the coded packets received by the second transceiver are sufficient together with received data packets of the first block of data packets to reconstruct the one or more lost data packets, reconstructing the one or more lost data packets; and
   in the event the coded data packets received by the second-transceiver are not sufficient together with received data packets of the first block of data packets to reconstruct the one or more lost data packets, transmitting a second set of coded data packets.

* * * * *